United States Patent [19]
Chen et al.

[11] Patent Number: 5,881,129
[45] Date of Patent: Mar. 9, 1999

[54] SELF-MONITORING LINE INTERFACE CIRCUIT

[76] Inventors: Robert Kuo-Wei Chen, 194 Rosemont Dr., North Andover, Mass. 01845; John C. Gammel, R.D. #1 Box 454, Womelsdorf, Pa. 19567; DeWayne Alan Spires, 2 Harriman Rd., Plaistow, N.H. 03865

[21] Appl. No.: 693,428

[22] Filed: Aug. 7, 1996

[51] Int. Cl.$^6$ .............................. H04M 1/24; H04M 3/08; H04M 3/22

[52] U.S. Cl. .................................... 379/5; 379/1; 379/27; 379/29; 379/399

[58] Field of Search ................................. 379/1, 2, 6, 27, 379/29, 30, 31, 34, 331, 324, 373, 377, 378, 382, 399, 401, 398, 412, 413, 414, 418

[56] References Cited

U.S. PATENT DOCUMENTS

| | | | |
|---|---|---|---|
| 4,270,030 | 5/1981 | Brolin et al. | 379/27 |
| 4,856,059 | 8/1989 | Halbig | 379/412 |
| 5,003,554 | 3/1991 | Chism | 375/10 |
| 5,357,513 | 10/1994 | Kay et al. | 370/95.3 |
| 5,659,608 | 8/1997 | Stiefel | 379/399 |
| 5,661,794 | 8/1997 | Rosch et al. | 379/399 |

*Primary Examiner*—Curtis A. Kuntz
*Assistant Examiner*—Binh K. Tieu

[57] ABSTRACT

A line circuit whose circuit components are selectively controllable by a microprocessor/DSP to provide normal BORSCHT functions or to be selectively tested without need for an electromechanical relay to isolate the line circuit from the loop conductors. The conventional line transformer is advantageously replaced by a loop current feed resistor network and either a high voltage or a lower voltage battery may be connected to provide loop current to the resistor network through a current regulator circuit and battery switch circuit. In normal operation, an ac feedback path, which includes the line receive amplifier, increases the terminating impedance above the dc value of the feed resistors so the loop termination resistor network may match the characteristic impedance of the loop at the audio frequencies employed. In the testing mode, the microprocessor/DSP selectively applies or denies power to the line driving and receive amplifiers as well as to a level shifting circuit interposed between the codec analog output and the input to isolate or include these components or to provide a codec loop-back path. The condition of the dc feed resistors and protective fuses, the condition of the loop closure detector and of the ringing generator are reported to the microprocessor/DSP over the same terminal normally used for reporting the on-hook and off-hook status of the loop.

34 Claims, 6 Drawing Sheets

SELF-MONITORING LINE INTERFACE CIRCUIT

This application claims the benefit of U. S. Provisional Application No. 60/017372

FIELD OF THE INVENTION

This invention relates to the maintenance and reliability of telephone service provided to subscribers' lines (loops) and, more particularly, to the interface circuits (SLICs) serving such lines.

BACKGROUND OF THE INVENTION

A telephone line circuit, traditionally located at the telephone central office, provides a number of functions for the customer loop it serves. "BORSCHT" is the mnemonic frequently used to identify the principal ones of such functions: battery feed, over-voltage protection, ringing, supervision of the loop, coding/decoding, hybrid function, i.e., connection of two-wire subscriber line to the four-wire network, and testing.

The growing trend to the concentration of customer lines remote from the central office requires that BORSCHT functions be provided by line cards remotely located from the central office switch—with the result that the automatic testing equipment of the central office is no longer locally available to the line circuit. Accordingly, it would be desirable to provide a line interface circuit which could accomplish, in a self-contained manner, many of the testing functions priorly requiring the local availability of central office switching equipment. Additionally, it would be advantageous to reduce the cost and size of the line interface circuit without sacrificing reliability. In particular, it would be advantageous to eliminate the need for the line transformers and electromechanical loop isolation relay that has previously been required to disconnect the Tip and Ring conductors of the customer loop from the line circuit so the line circuit could be tested without being affected by, or affecting, conditions on the loop.

It has heretofore been recognized that one of the conventional electromechanical relays, namely, the ringing relay, whose transfer contacts connect the ring conductor of the loop either to the line circuit or to the ringing generator, may be replaced by a transistor switch. U.S. Pat. No. 4,652,701 issued Mar. 24, 1987 to R. J. Cubbison, Jr. teaches that when the relay is replaced by a transistor switch it is necessary to provide a feedback path to prevent the finite resistance of the cutoff transistor from coupling the ringing signal into the line circuit and to compensate for the transistor's finite forward resistance to prevent longitudinal unbalance.

It has also been appreciated, as for example in U.S. Pat. No. 5,341,416 issued Aug. 23, 1994 to J. C. Gammel, that the rapid detection of the off-hook condition when the ringing signal is applied to the loop, i.e., high-speed ring trip, can be achieved by monitoring the ringing signal polarity and cutting off the ringing current when it rises above a certain threshold amplitude during a particular polarity of the ringing voltage.

It would be advantageous if a line circuit could be provided which was capable, without need for an electromechanical loop isolating relay, of determining whether there are false crosses or grounds on the tip and ring conductors and of verifying the condition of the line circuit's fuses, DC feed and voice frequency terminating impedances, codec and tip and ring driving amplifiers as well as the ring trip and loop closure detectors. It would be advantageous to be able to ascertain the condition of these circuits under different battery supply voltages.

SUMMARY OF THE INVENTION

The foregoing and other objects and features of my invention are realized in an illustrative embodiment of a four-wire line circuit whose circuit components are selectively controllable by a microprocessor/DSP to provide normal BORSCHT functions or to be selectively tested without need for an electromechanical relay to isolate the line circuit from the loop conductors. The conventional line transformer is advantageously replaced by a loop current feed resistor network and either a high voltage or a lower voltage battery may be connected to provide loop current to the resistor network through a current regulator circuit and battery switch circuit. In normal operation, an ac feedback path, which includes the line receive amplifier, increases the terminating impedance above the DC value of the feed resistors so the loop termination resistor network may match the characteristic impedance of the loop at the audio frequencies employed. A level shifting circuit between the codec analog output and the input to the line driving amplifiers establishes a DC level for the signal applied to the loop so as to preserve the dynamic range of the codec signal irrespective of which battery is connected to supply the loop. The line receive amplifier, which is directly coupled to the resistor network, reports on-hook and off-hook loop status to the microprocessor/DSP through a comparator which is biased by whichever battery is supplying the loop. Different discharge paths for the Miller capacitor, which shunts the current limiter to provide a low impedance path for the audio frequency analog signals transmitted over the loop, are selected by the microprocessor/DSP depending on whether the ringing or the disconnect forward state is to follow the disconnection of the battery supplying loop. The Miller capacitor is rapidly discharged prior to ringing so that it does not loading the ringing signal but slowly discharged prior to disconnect forward to avoid introducing a noise spike on the loop.

In the testing mode, the microprocessor/DSP selectively applies or denies power to the line driving and receive amplifiers as well as the level shifting circuit interposed between the codec analog output and the input to isolate or include these components in the circuit. The condition of the feed resistors and protective fuses and of the loop closure detector is reported to the microprocessor/DSP over the same terminal normally used for reporting the on-hook and off-hook status of the loop.

A number of tests are performed, as follows:

1. a loop back test in which the tip and ring driving and receive amplifiers and their interface to the codec are turned off to place them in a high impedance state so as to isolate the codec's input and output from the tip and ring conductors of the loop, the microprocessor/DSP applies a digital tone code to the codec's digital input, the codec's analog output is connected to its analog input and the codec's digital output is connected to the microprocessor/DSP for analysis;

2. a tip side transmission test in which the tip side driving amplifier and the receiving amplifier are enabled but the ring side driving amplifier is turned off and placed in a high impedance state; the microprocessor/DSP issues a digital tone code to the codec's digital input, the codec's analog output supplies a test tone to the tip driving amplifier and the tone's reflection from the resistor network as sensed by the receive amplifier is applied to the codec's analog input and the codec's digital output is analyzed by the microprocessor/DSP to determine if the enabled amplifiers, loop terminating resistors and coupling capacitors are functional;

3. a ring side transmission test which performs counterpart functions for the ring side transmission path;

4. a test (which uses part of the loop closure detector circuitry) to report the state of the DC feed resistors and fuses with high battery applied;

5. a test of the DC feed resistors and fuses with low battery applied through the current limiter biased for linear operation with no loop current (as for on-hook transmission);

6. a test of the loop closure detector forced on-hook, the receive amplifier being turned off and the input of the loop closure detector being connected to a voltage that is a fraction of normal battery;

7. a test of the loop closure detector forced off-hook, the receive amplifier being turned off and the input to the loop closure detector being connected to ground;

8. a test of the ringing generator, performed prior to applying ringing to the phone, in which the 20 Hz clock is internally forced to +5 V, the ringing generator is turned on and its output ramped from VBAT1 to ground;

9. a ring trip test, which follows the test of the ringing generator, in which the ringing generator is turned off, an SCR in the over-voltage protection circuit is turned on and the loop current is limited by the current limiter. If NRDET reports ring trip to the microprocessor/DSP too soon or too late after the ring trip detector is enabled, the condition indicates that ringing should not be applied to the loop;

10. a ring trip reset state in which the ring trip filter capacitor is discharged prior to applying ringing to the loop; and 11. a noise test in which all amplifiers and the receive interface are powered down but the battery switch is turned on and the idle channel noise from the loop that appears at the analog input of the codec is measured.

BRIEF DESCRIPTION OF THE DRAWING

The foregoing objects and features may be come more apparent when the ensuing description is read together with the drawing in which.

GENERAL DESCRIPTION

Figure 1:
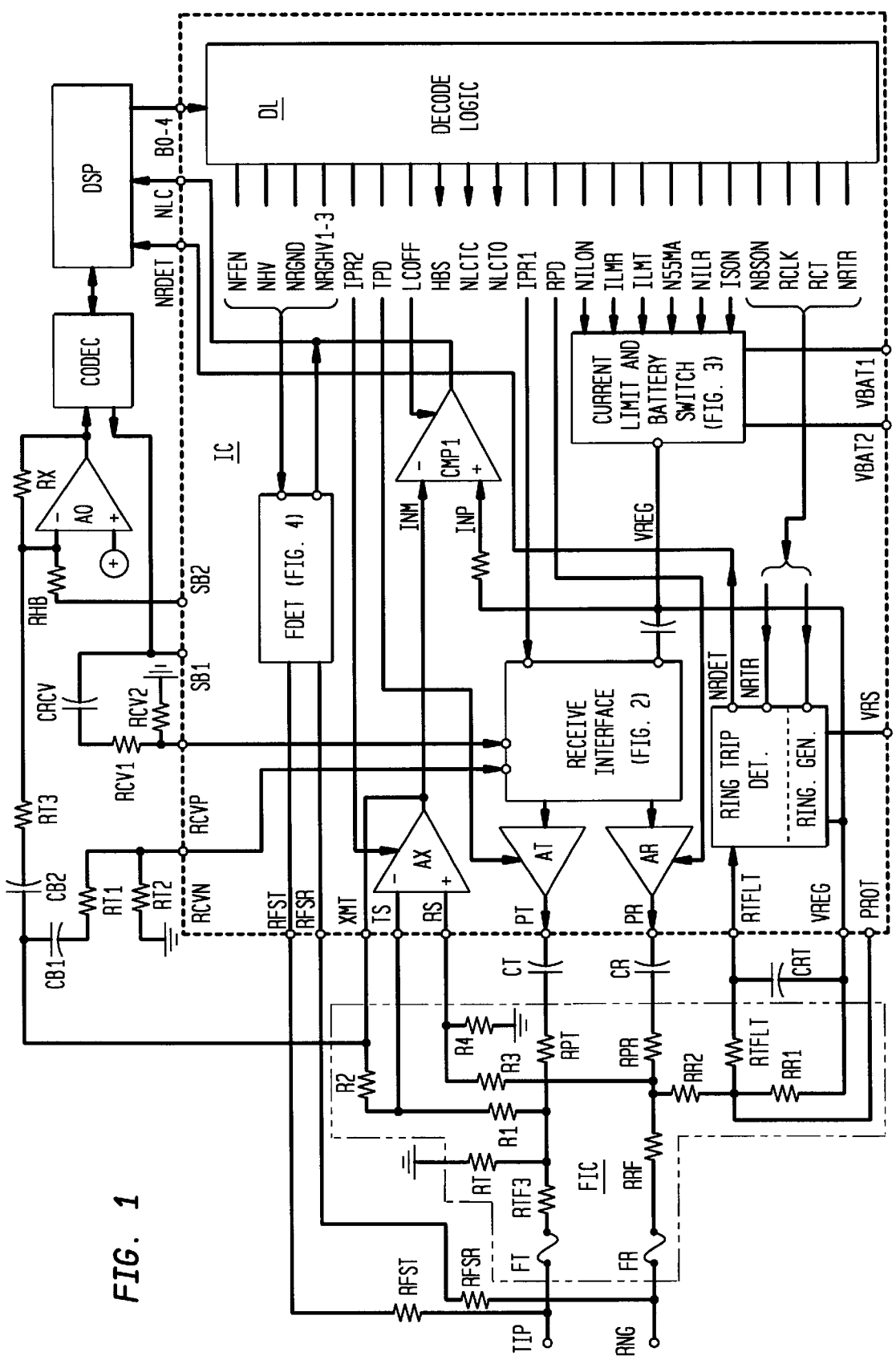
FIG. 1 is a block diagram of the illustrative embodiment of a four-wire line interface circuit providing BORSCHT functions and self-testing under the control of a microprocessor/DSP.

FIG. 1 is a block diagram showing the principal components of the customer loop interface circuit of the present invention. At the left-hand side of FIG. 1, enclosed within the dashed lines, a thick film subassembly FIC incorporates the DC feed resistors and fuses in one package having terminals TIP and RNG to which the tip and ring conductors of the loop circuit are respectively connected. Subassembly FIC includes fuses FT and FR for over-current protection of the tip and ring leads, respectively, and a plurality of resistors for feeding the DC current or applying the ringing signal to the loop, as well as for providing basic impedance matching for audio frequency coupling to the loop. The thick film resistors of subassembly FIC are advantageously designed to fail open rather than short-circuited under power cross conditions and, should a sufficiently heavy power cross occur to cause the FIC to crack, the opening of the DC feed resistors would remove battery and ground feed from the loop.

A second subassembly, IC, contains the major electronic amplifying and testing components of the line interface circuit on an integrated circuit chips and an external codec and microprocessor digital signal processor DSP complete the arrangement of line interface components for providing the BORSCHT functions to the loop.

The battery switch of the line interface circuit is capable of connecting a current limited higher voltage battery (VBAT1) to the loop when the line is on-hook to increase signaling range and a lower voltage battery (VBAT2) when the line is off-hook to reduce power consumption. The line interface subassembly IC includes a current limiter and battery switch sub-circuit for providing a voltage-regulated, limited current to the loop from either of the battery supplies as well as for selecting the battery supply to be used. When the loop is idling, the battery switch is turned on to employ the VBAT1 supply, typically −48 V, and regulated current is applied by the current limiter to the ring conductor at terminal VREG to provide sufficient open circuit voltage between tip and ring to allow various customer premises equipment to work properly at maximum range. When the subscriber goes off hook, the battery switch is turned off and the VBAT2 supply, typically −24 V, is connected to the ring lead via the current limiter to minimize power dissipation. The current limiter provides a maximum of 23 mA current to a maximum loop resistance of 430 Ω through 480 Ω of feed resistance. The regulated current is applied from terminal VREG of the current limiter to the ring lead via battery feed resistors (typical values) RR1 (75 Ω), RR2 (125 Ω), RRF (40 Ω) and fuse FR. Ground is supplied to the tip conductor over resistors RT (200 Ω) and RTF3 (40 Ω), and fuse FT. Resistors RFST and RFSR (each, illustratively 1 megohm) are connected between the tip and ring leads and the fuse and feed resistance detector circuit, to be hereinafter described.

Subassembly IC also includes the line driving amplifiers for the tip and ring of the customer loop AT and AR respectively and the audio frequency receive amplifier AX which is directly coupled to the loop conductors. The audio frequency output signal provided by amplifier AT at terminal PT is coupled to the tip lead via capacitor CT and resistors RPT and RTF3, while the audio frequency output signal provided by amplifier AR at terminal PR is coupled to the ring lead via capacitor CR and resistors RPR and RRF. Resistors RPT and RPR are, typically, 2400 Ω each. Resistors R1 and R3 directly couple the tip and ring conductors to input terminals TS and RS of amplifier AX which, at its output terminal XMT, reports the on-hook and off-hook loop state to input INM of loop closure comparator CMP1. The ac signal appearing between tip and ring conductors is sensed by amplifier AX and applied to the junction of capacitors CB1 and CB2. Capacitor CB1 together with resistor divider RT1, RT2 couple a portion of the ac signal to terminal RCVN of the receive interface RI and capacitor CB2 and resistor RT3 couples the ac signal to amplifier AO at the analog input of the CODEC, shown at the top right-hand side of FIG. 1. The current limited DC voltage at the VREG terminal of the current limiter and battery switch is applied to terminal INP of loop closure comparator CMP1 so that comparator CMP1 monitors the DC state of the loop regardless of the voltage applied to the loop. Comparator CMP1 reports the loop closure state to the microprocessor/DSP at terminal NLC.

The various components of subassembly IC operate under the control of logic level signals delivered by decode logic DL. Decode logic DL receives logic level control signals from microprocessor/digital signal processor DSP over leads B0–B4. In turn, subassembly IC provides status information to microprocessor/DSP at output terminals NRDET and NLC. Microprocessor DSP also sends and receives signals from the codec. Decode logic DL provides individual control signals to the various amplifier and testing sub-circuits of subassembly IC according to the pattern of signals delivered over leads B0–B4, a detailed list of which appears in Tables 1 and 2.

The integrity of the battery feed resistors and the fuses as well as the battery potential applied to the loop is monitored by fuse and DC feed resistor detector FDET via high resistance resistors RFST and RFSR (each, illustratively 1 megohm). If one or both of the fuses or feed resistors fails, the output of the detector will indicate a fault when the loop is on-hook, the output of the fuse and feed resistor detector being reported to terminal NLC signal where it is applied to the microprocessor/DSP.

When ringing is called for, the battery switch is turned off and the ringing generator applies ringing voltage superimposed upon the highly negative battery supply (typically −180 V) connected at terminal VRS to terminal VREG. Amplifier AR is placed in the high impedance state so as not to load the ringing voltage supplied by the ringing generator. The presence of the high negative voltage on the ring lead is verified during ringing by the fuse and DC feed resistor detector circuit FDET which contains a threshold monitoring circuit that receives enabling signals NRHV1 through NRGHV3 from the decode logic DL. When the voltage on the ring lead crosses a predetermined negative threshold, circuit FDET reports this fact to terminal NLC.

The DC current flowing in the loop during ringing is monitored by the ring trip detector at terminal RTFLT and reported to terminal NRDET to indicate to the microprocessor/DSP when to trip ringing. The phase of the ringing generator is synchronized to a 20 Hz ringing clock. If off-hook is reported at terminal NRDET within 25 mS from the trailing edge of the 20 Hz clock, ringing should be tripped with less than one period delay. If off-hook is detected within 25 mS to 50 mS from the trailing edge of the 20 Hz clock, ringing should be turned off immediately, with no delay. After the ring trip test is concluded, the ring trip reset state is entered and the external filter capacitor CRT is discharged so that it will not fault trip the off-hook detector when ringing signal is applied to the loop. To discharge this capacitor, the logic circuit supplies the NRTR signal (see Table I), to turn on an N-channel FET during ring trip reset to provide a short circuit discharge path across capacitor CRT.

During normal operation of the line interface circuit the audio frequency signals from the left-hand (analog) output of the codec are coupled through capacitor CRCV and resistor RCV1 to terminal RCVP of receive interface RI from which they are applied to differential amplifiers AT and AR and then capacitively coupled onto the tip and ring conductors via capacitors CT and CR, respectively. The voltage across the tip and ring is sensed at terminals TS, RS by amplifier AX via voltage divider resistors R1, R3 and R4. The voltage divider resistors apply a fraction, illustratively one-fifth, of the tip and ring voltage to amplifier AX. A portion of the output of amplifier AX appearing at terminal XMT is fed back via capacitor CB1 and resistor divider RT1 and RT2 to terminal RCVN to increase the audio frequency terminating impedance exhibited to the loop tip and ring conductors. Without this audio frequency feedback, the terminating impedance would be determined solely by the DC resistance of resistors RTF3, RT, and RPT associated with the tip conductor, and resistors RRF, RR and RPR associated with the ring conductor. In the illustrative embodiment, this DC resistance would establish a terminating impedance of approximately 450 Ω which is less than the desired loop terminating impedance of 600 ohms. With the aid of receive amplifier AX and the feedback path, hereinafter to be described in connection with FIG. 2B, the terminating impedance for ac signals is increased to the desired level.

The signal at terminal XMT is also applied over capacitor CB2 and resistor RT3 to the inverting input of codec input amplifier AO. When activated by the channel test signal HBS from decode logic DL, transistor switch HB1 (FIG. 2A) connects together terminals SB1 and SB2 so that the signal at terminal XMT may be summed in resistor RHB with the signal from the codec analog output. In the illustrative embodiment, the codec accepts an input analog signal having a 5 volt dynamic range. To translate this swing so that it referenced about zero volts, a bias voltage of 2.5 volts DC is applied to the non-inverting input of codec amplifier AO so that the signal applied to the codec would swing between ground and plus 5 volts.

The output of receive amplifier AX is also applied to the INM input of loop closure comparator CMP1. Resistor divider RLC1, RLC2 (best shown in FIG. 2A) applies a fraction of the voltage at terminal VREG to the INP input of comparator CMP1 so that the threshold for loop closure detection will be proportional to the voltage at terminal VREG. Since the loop closure detection threshold varies with the VREG voltage, the output of comparator CMP1 at terminal NLC correctly reports loop closure independently of the battery voltage applied to the loop. In the normal power-up talk state (see Tables I and II, line 1), amplifiers AT and AR are powered up, the battery switch is turned on connecting VBAT1 to the ring lead and terminal NLC indicates logic high if the loop is open, i.e., on-hook. When the line goes off-hook (see Tables I and II, line 2), the battery switch is turned off and VBAT2 is connected via the current limiter.

Figure 4A:
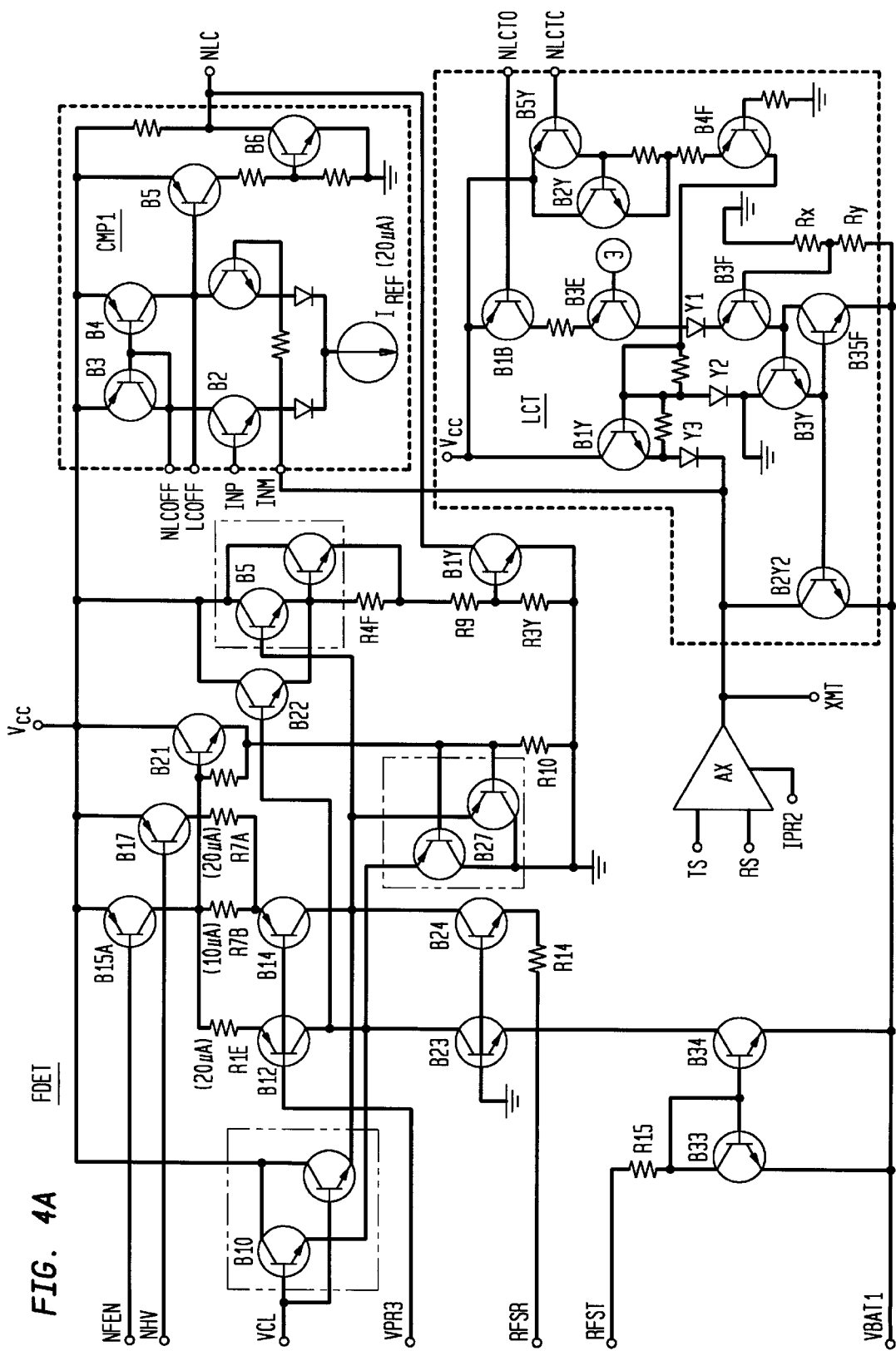
FIGS. 4A and 4B show details of the fuse and DC feed resistor detector (FDET) and the loop closure comparator (CMP1) of FIG. 1 as well as the loop closure detector test (LCT) circuitry.
Figure 4B:
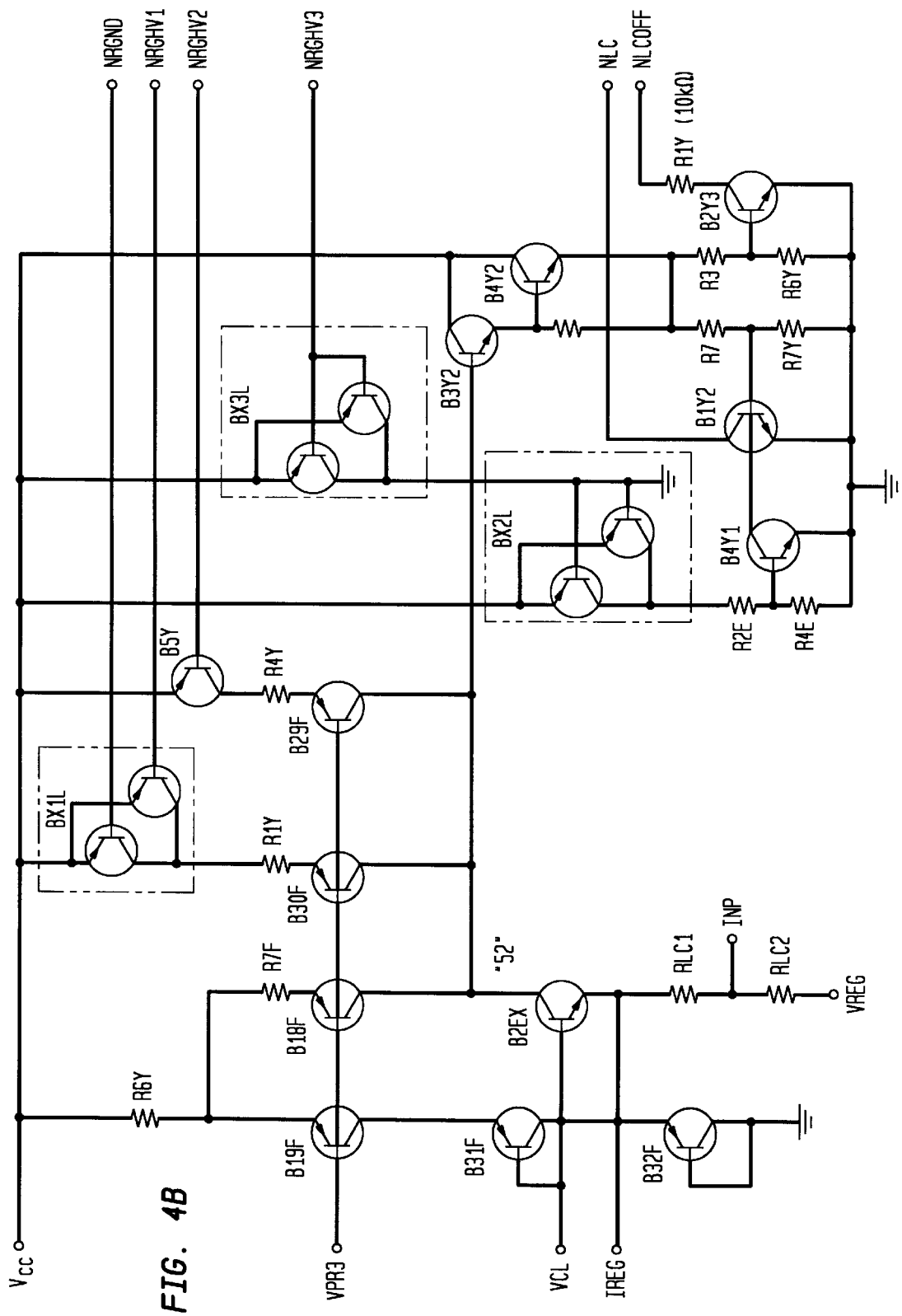

During ringing (see Tables I and II, line 3), amplifiers AT, AR and the receive interface RI are powered down to conserve power, the battery switch is turned off, the ringing generator is turned on and the high voltage detector, FIG. 4B, is enabled. The fuse detector senses when the ring lead voltage crosses the predetermined negative threshold and reports a logic level high signal to terminal NLC to indicate the presence of high ringing voltage.

AC IMPEDANCE MODIFICATION, FIG. 2B

It was mentioned above that the value of the DC feed resistors would establish a terminating impedance of approximately 450 Ω, i.e., less than the desired loop terminating impedance of 600 ohms for the ac signals transmitted over the loop. The amount of DC feed resistance is constrained by the requirement to minimize off-hook power dissipation while providing a minimum current, illustratively 23.5 ma., into a maximum loop resistance of 430 ohms from the lower voltage battery, VBAT2. This determines that the maximum DC resistance of the feed resistors cannot exceed about 450 ohms. This is less than the 600 ohm ac characteristic impedance of the loop. To make the ac driving point impedance of the line interface circuit match the 600 ohm characteristic impedance of the loop, despite the lower DC resistance of the feed resistors, a feedback path comprising amplifier AX and the level shifting receive interface RI is employed.

Figures 2A, 2B:
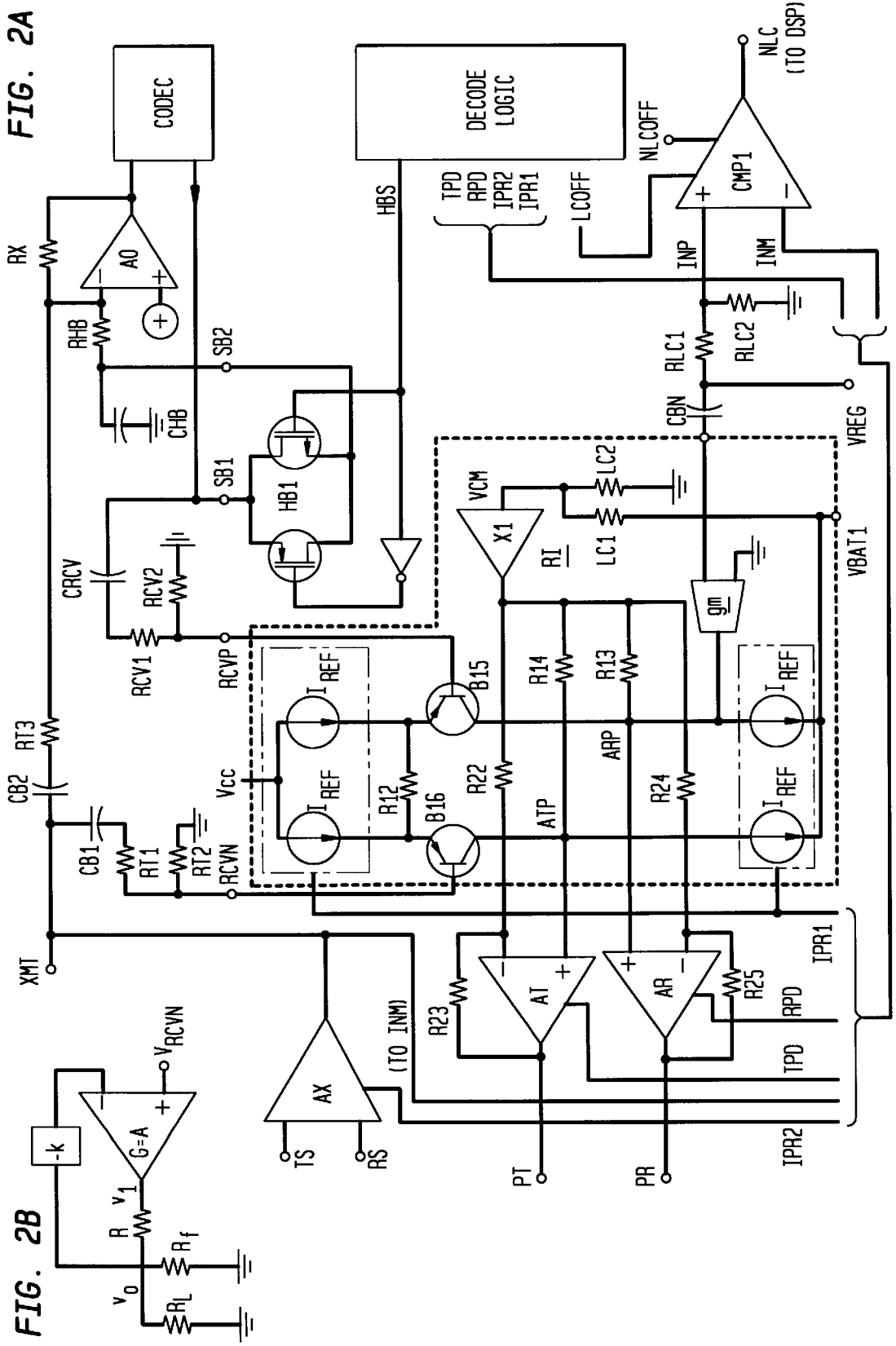
FIGS. 2A and 2B show details of the receive interface (RI) circuit intermediate the codec and the loop driving amplifiers and a portion of the loop closure detector of FIG. 1.

For purposes of analyzing how the ac feedback path increases the effective ac impedance looking into the loop, reference may be made to FIG. 2B where the differential amplifiers AT and AR have been replaced by a simplified, composite amplifier G=A and the feedback path amplifier AX has been replaced by the box "–k". In FIG. 2B, $R_L$ represents the 600 ohm characteristic impedance of the loop while the total tip side DC feed resistance (FIG. 1: RT+RTF3=240 ohms) and the total ring side DC feed resistance (FIG. 1: RRF+RR2+RR1=240 ohms) have been replaced by a single resistor $R_f$. When the interface circuit presents a terminating impedance of 600 ohms to the loop, the combination of $R_f$ in parallel with the impedance presented by the amplifier and feedback path must be 600 ohms. The composite amplifier has a gain of A from its inverting input (–) and a gain of $A_{RCVP}$ from its non-inverting input (RCV).

Let the parallel combination of $R_L$ and $R_f$ be represented by $R_L'$. Let us assume a unit driving point current, I, into point $v_1$ with $V_{RCVN}$ zero:

$$A = \frac{R}{R_T} = \frac{4700}{300} = 16 \qquad (1)$$

$$A = R_T = 300 = 16 \qquad (2)$$

$$A = \frac{R}{R_T} = \frac{4700}{300} = 16 \qquad (3)$$

Dividing equation (3) by $v_o$ yields the driving point admittance, $1/R_T$:

$$A = \frac{R}{R_T} = \frac{4700}{300} = 16 \qquad (4)$$

which, assuming the 600 ohm line will be terminated in 600 ohms by the line interface circuit, makes $R_T$=300 ohms. Now, solving equation (4) for kA:

$$A = \frac{R}{R_T} = \frac{4700}{300} = 16 \qquad (5)$$

$$A = \frac{R}{R_T} = \frac{4700}{300} = 16 \qquad (6)$$

$$A = \frac{R}{R_T} = \frac{4700}{300} = 16 \qquad (7)$$

$$A = \frac{R}{R_T} = \frac{4700}{300} = 16 \qquad (8)$$

From equation (4), $$A = \frac{R}{R_T} = \frac{4700}{300} = 16 \qquad (9)$$

and substituting into (8):

$$A = \frac{R}{R_T} = \frac{4700}{300} = 16 \qquad (10)$$

Accordingly, for $R_T$=300 ohms and using a receive gain $A_{RCV}$ of 1, $R_f$=480, R=4700 ohms, and $R_L'$=266 ohms and substituting these values into equation (5):

$$\frac{A}{R_T} \quad \frac{16}{300} \qquad (11)$$

and, from equation (10):

$$A = \frac{R}{R_T} = \frac{4700}{300} = 16 \qquad (12)$$

Substituting the value found in equation (12) into equation (11) yields k=3/16=0.188. If the gain of the AX amplifier is 0.2, then the values of resistors RT1 and RT2 of FIG. 1 should be in the ratio of 0.188/0.2 or 0.94.

RECEIVE INTERFACE "RI" and LOOP CLOSURE DETECTOR (FIG. 2A)

The receive interface RI receives the "single-ended" output of the codec and supplies differential analog signals to the line driving amplifiers for the tip and ring, AT and AR, respectively. In addition, the receive interface establishes the DC level of the analog signal which the line driving amplifiers apply to the tip and ring conductors so as to accommodate the maximum dynamic range of that signal as provided by the codec analog output. It will be recalled that the tip conductor is normally at or close to ground potential while the ring conductor is at a negative voltage. The receive interface establishes the DC level of the analog output midway between ground and VBAT1 to prevent clipping of the codec's analog signal by the potential appearing on the loop conductors. More particularly, the "single-ended" analog output of the codec is connected to terminal RCVP of the receive interface at the base of transistor B15 whose collector emitter path is situated between a right-hand pair of constant current sources each denominated $I_{Ref}$ both of which are controlled by the IPR1 signal issuing from decode logic DL. When the IPR1 signal is in the "0" state, the constant current sources are powered up. The upper-most source may be thought of as a source while the lower-most source may be thought of as a constant current sink of the same current value, illustratively 200 microamperes. The emitter collector path of another transistor, B16, is similarly connected between a corresponding pair of constant current sources. The base of transistor B16 is connected to the junction of resistor divider RT1, RT2 at terminal RCVN. Both pairs of constant current sources are controlled by the IPR1 logic level signal from decode logic DL. If the analog signal output of the codec applied to the base of transistor B15 would tend to increase the conductivity of this transistor, the increased emitter current cannot come from the upper right-hand constant current source but must be supplied by resistor R12 diverting some of the current supplied by the upper left-hand constant current source that would normally flow through transistor B16. But since the lower left-hand constant current source must continue to sink the same amount of constant current that it did before the codec drove the base of transistor B15, the diverted current must be returned to it. The increased current through the collector of transistor B15 flows from point ARP through serially-connected resistors R13 and R14 to point ATP where it returns to the lower left-hand current sink. The increased current through resistors R13 and R14 makes point ARP more positive with respect to point ATP. Accordingly, point ATP in the collector circuit of transistor B16 is driven 180° out of phase with the drive applied to point ARP in the collector path of transistor B15 so that amplifiers are provided with the required differential analog signals albeit the codec only provided a single-ended output. The analog drive at point ATP is applied to the non-inverting input of amplifier AT while the drive at point ARP is applied the non-inverting input of amplifier AR. When the IPR1 signal is in the "1" state, the constant current sources are powered down and the output of the codec is isolated from the input to line driving amplifier AT and AR.

Equal value resistors LC1 and LC2 at the input of buffer amplifier X1 establish the DC level of the analog voltage developed at points ATP and ARP so that it lies midway between ground and VBAT1. This provides a maximum dynamic range for the analog signal applied to the tip and ring conductors. Resistor R22 in series with the inverting input of amplifier AT and feedback resistor R23 across amplifier AT establish the gain of amplifier AT from its non-inverting input to terminal PT at an illustrative value of 6. Similar considerations apply to resistors R24 and R25 associated with amplifier AR.

A noise cancellation arrangement is provided by the transconductance stage gm, capacitor CBN and VREG so that any ac noise present at point VRBG is applied to point ARP in a manner to cancel out the noise in the analog signal applied at RCVP. Briefly, however, any noise voltage appearing at terminal CBN is converted to a current by the transconductance stage which current produces a voltage at point ARP of magnitude and polarity sufficient to cancel the noise voltage from affecting transmission on the tip and ring conductors. Further details of the noise cancellation circuit may be found in the co-pending application of Ian. A. Schorr, Ser. No. 08/359,164, filed on Dec. 19, 1994.

Referring briefly now to FIG. 1 it will be seen that the line receiving amplifier AX has its input directly coupled to the tip and ring conductors of the loop. The output of the AX amplifier is connected to the inverting input INM of loop closure comparator CMP1, as shown in greater detail in the upper right-hand side of FIG. 4A. The non-inverting input INP of comparator CMP1, as shown in FIG. 2A, is connected to the junction of resistors RLC1 and RLC2 which form a resistor divider to ground from terminal VREG that supplies the loop with DC current. The ratio of RLC1 and RLC2 determines the threshold of loop closure resistance detectible by CMP1. The NLC output of comparator CMP1 is reported to the microprocessor/DSP. Comparator CMP1 thus reports the actual condition of the loop as determined by the DC state reported by line receive amplifier AX. When amplifier AX is placed in the high impedance state, the loop closure threshold may be checked by circuit LCT, FIG. 4A. Circuit LCT can force the INM input of comparator CMP1 to ground (decode logic DL signals NLCTO=0, NLCTC=0) or to a fraction of VBAT1 (decode logic signals NLCTO=0, NLCTC=1).

CHANNEL TEST

Channel test is to be carried out when the loop is on-hook, as determined by microprocessor/DSP monitoring terminal NLC for the logic high state. Should the loop go off-hook during the test program, the test program is aborted. The logic level signals provided by decode logic DL to the various components of subassembly IC during the various tests are set forth in Table I appearing at the end of the specification.

1. LOOPBACK TEST

In this state, the microprocessor/DSP commands decode logic DL to issue the signals shown in line 7 of Tables I and II. The "PD" abbreviations in the "Condition/Test" column of these tables indicate a power down of the loop driving amplifiers AT and AR, the loop receive amplifier AX and the receive interface RI, except as otherwise noted. The output of the AX amplifier is held at ground and the current limiter is turned off. With the loop driving amplifiers and receive amplifiers powered down, the amplifiers are placed in the high impedance state and the loop is isolated from the analog input and output of the codec. With the codec thus isolated from the loop, decode logic DL applies the HBS signal (FIG. 2A) to turn on transistors HB1 to establish a loop back connection. In the loop back connection, hybrid resistor RHB is connected between the output of the codec and its input, which path may be traced from the codec's output to terminal SB1 through either the P-channel or N-channel transistors HB1 to terminal SB2 and resistor RHB to the inverting input of codec amplifier AO. The microprocessor DSP may then apply a digital tone signal to the digital side of the codec which the codec converts to the counterpart analog signal that is applied through transistor switch HB1 to the inverting input of amplifier AO and returned to the analog input of the codec, converted by the codec to the counterpart digital signal and analyzed by the DSP.

2. TRANSMISSION TEST—TIP SIDE ONLY WITHOUT HYBRID

In this state, summarized at line 9 of Tables I and II, all circuits are powered up ("PU"), except that the ring lead drive amplifier AR is turned off ("powered down") by decode logic DL signal RPD=1. Switch HB1 located between terminals SB1 and SB2 (FIG. 2A) is open so that terminal RCVP is not connected through to hybrid resistor RHB (decode logic DL output HBSW=0). The codec, at its digital input, is instructed by DSP to inject a test tone, illustratively, −10 dBm at 1 kHz, into the analog receive port RCVP. Amplifier AT being active and amplifier AR being powered down, the signal is applied only to the tip lead. The reflection is sensed by amplifier AX and appears at transmit port XMT from which it is applied to the inverting input of amplifier AO and thence to the analog input of the codec. Should the tip lead be open, the reflection would be about 6 dB below the test tone. If, however, the tip and ring are properly terminated by 600 ohm or 900 ohm impedances, the reflection will be about 11 dB below the tone. If the tip lead is shorted to ground, the reflection decreases significantly to about 23 dB below the test tone. If there is any failure on the tip side of the interface, such as an inoperable AT amplifier, an open coupling capacitor CT and/or resistor RPT, no reflection will appear at the 4-wire port. If the DC feed resistors (RT, RTF3, RRF, or RR) have failed open while all other resistors within the dashed lines of FIC remain intact, there will be massive overload at the 4-wire port. Idle channel noise received by amplifier AX appears at terminal XMT and is similarly measured.

3. TRANSMISSION TEST—RING SIDE ONLY; High Battery Fuse Test

In this state, summarized at line 8 of Tables I and II, all circuits are powered up with the exception of amplifier AT (decode logic DL signal TPD=1). Hybrid resistor RHB is disconnected from terminal RCVP by opening switch HB1 (FIG. 2A). A test tone, 10 dBm at 1 kHz, is injected by the codec at receive port RCVP. The reflection appears at the transmit port XMT. Should the ring lead be open, the reflection would be about 6 dB below the test tone. If, however, the tip and ring are properly terminated by 600 ohm or 900 ohm impedances, the reflection will be about 11 dB below the tone. However, if for some reason, the ring lead is shorted to ground, the reflection decreases significantly to about 23 dB below the test tone. If there is any failure on the ring side of the interface, such as an inoperable AR amplifier, an open coupling capacitor CR and/or resistor RPR, no reflection will appear at the 4-wire port. If the DC feed resistors (RT, RTF3, RRF, or RR) have failed open while all other resistors within the dashed lines of FIC remain intact, there will be massive overload at the 4-wire port. Idle channel noise is similarly measurable at the 4-wire port.

4. FUSE TEST—HIGH BATTERY

In this state, summarized at line 10 of Tables I and II, the line driving and receive amplifiers AT, AR, AX and receive interface RI are powered down but the battery switch is turned on (decode logic DL signals NHV=0, NBSON=0). The fuse detector circuit FDET (FIGS. 4A and 4B) applies to the NLC terminal output of comparator CMP1 a signal that indicates the condition of the feed resistors and fuses. The tip lead is connected to ground and the fuse detector threshold for lead RFST is set to −27 V. The ring lead is connected to VBAT1 and the fuse detector threshold for lead RFSR is set to −35 V. The fuse & feed resistor detector FDET circuit is enabled by decode logic DL outputs NFEN=0, NHV=0. If the fuses and DC feed resistors are intact, and the tip lead and the ring lead are at ground and VBAT1, respectively, the FDET circuit will report a pass condition signal as a logic high at terminal NLC. If one or both fuses, or one or both feed resistors (i.e., RT and/or RR) fail open, a logic low will be reported to terminal NLC. It may be noted that if the loop goes off-hook during the test, the FDET circuit will indicate a fault, however, microprocessor/DSP verifies whether this is a fault condition by changing to the normal power-up state to look at the loop closure output on lead NLC. If loop closure is detected (NLC at logic low), the fault indication is disregarded.

5. FUSE TEST—LOW BATTERY

This state, summarized at line 11 of Tables I and II, is the same as fuse test—high battery, except that the battery switch is turned off (decode logic DL signals NBSON=1, NHV=1). Proper operation of the current limiter when the loop is in the on-hook condition, i.e., when no actual loop current is flowing, requires that a linearizing bias current be supplied to the current mirror portion of the battery switch and current limiter circuit. This bias current (illustratively, 12 mA DC.), may advantageously be obtained from the ringing generator over lead IBSON which receives the ISON signal from the decode logic DL. The tip lead is connected to ground and its fuse detector threshold is set to −27 V. The ring lead is connected to VBAT2 and its fuse detector threshold is set to −10 V. If the fuses and DC feed resistors are intact, and the tip lead and the ring lead are at ground and VBAT2, respectively, the Fuse & Feed Resistor Detector will be enabled (decode logic DL outputs NFEN, NHV low) and indicate a pass condition signal which appears as a logic high on lead NLC. If one or both fuses, or one or both feed resistors (i.e., RT and/or RR) fail open, lead NLC will indicate a logic low.

6. LOOP CLOSURE TEST—NLC FORCED ON-HOOK

In this state, summarized at line 12 of Tables I and II, all circuits and the battery switch are powered up, except the receive and transmit paths (amplifiers AT, AR, AX and the receive interface RI) are powered down to conserve power. The output of amplifier AX at the INM input to loop closure comparator CMP1 is connected to voltage that is about $\frac{1}{5}$ VBAT1 to test the loop closure detection. This checks both the input voltage at terminal LCTH as well as the operation of loop closure comparator CMP1. If the loop goes off-hook during the test, this test will still pass even if the battery switch goes into current limit. The assumption is made in this test that since the AX amplifier has passed the above transmission tests, its DC offset voltage is within specification. Even if the AX amplifier has drifted away from its specification, the on-hook and off-hook will still properly be detected since it is highly improbable that the AX amplifier could pass the transmission test while causing the loop closure detection to fail.

7. LOOP CLOSURE TEST—NLC FORCED OFF-HOOK

This test, summarized at line 13 of Tables I and II, is the same as above, except that the output of amplifier AX is connected to ground. The loop closure comparator CMP1 should indicate off-hook. If the loop goes off-hook during the test, the test will not be affected since the voltage at terminal VREG should not go to 0 volts.

8. RINGING GENERATOR TEST—OUTPUT AT GROUND

This test, summarized at line 14 of Tables I and II, is performed prior to applying ringing to the phone and in preparation for the ring trip test. The receive transmission path (AT, AR and receive interface RI) is powered down to conserve power. The 20 Hz clock is internally forced to +5 V, the ringing generator is turned on and its output is ramped from VBAT1 to ground. The VREG detector is enabled and its threshold is set to detect −15 V at terminal VREG. Terminal NLC reports a logic low (indicating test pass) if the voltage at VREG is more positive than −15 V.

9. RING TRIP TEST

Figure 3A:
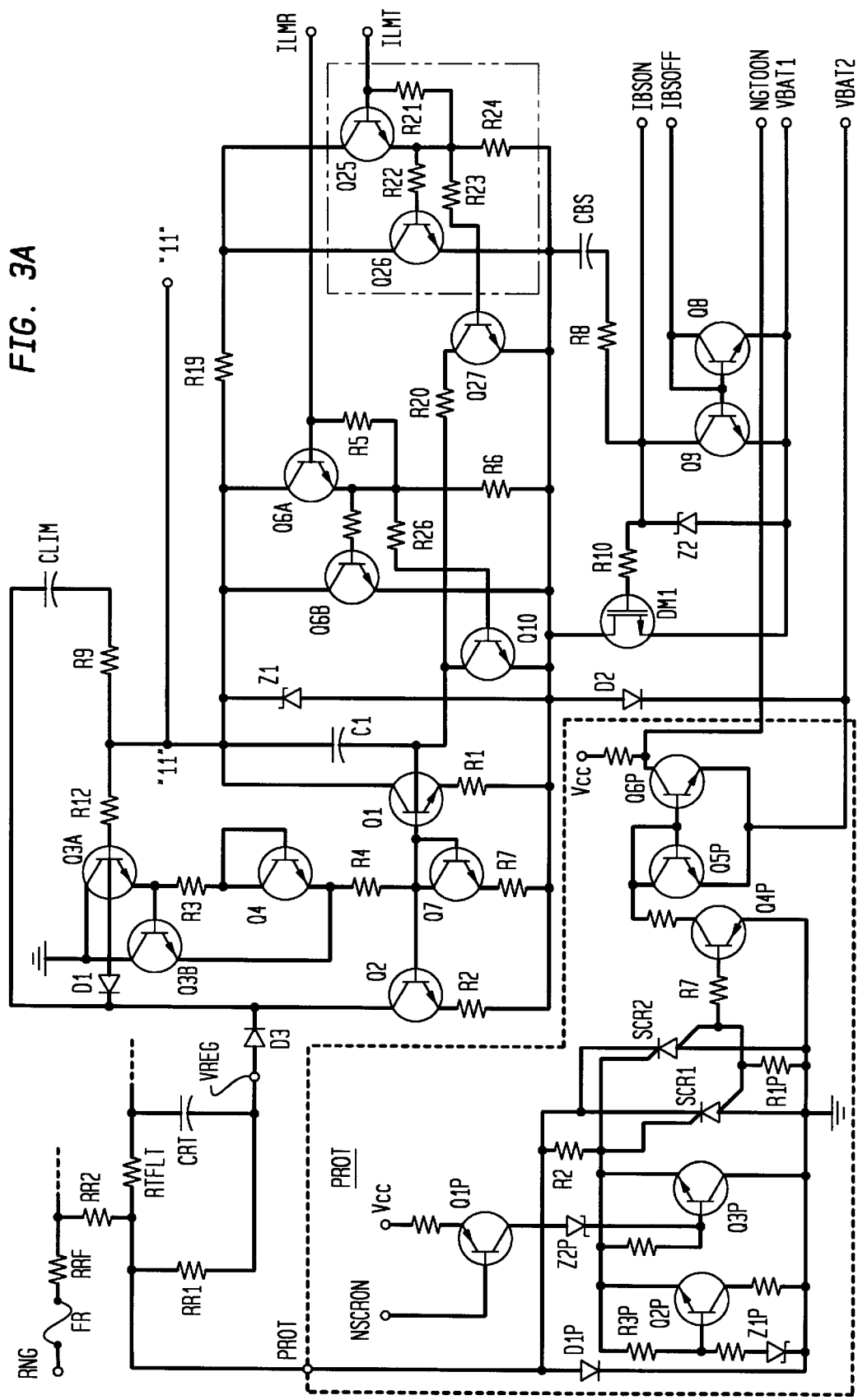
FIGS. 3A and 3B show details of the current limiter (CL) and protection (PROT) circuits of FIG. 1.

In this test, summarized at line 15 of Tables I and II, the ringing generator is turned off but the SCR in the protection circuit, FIG. 3A, is forced on (decode logic DL signal NSCRON=0) thereby connecting terminal VREG to ground in series with resistor RR1. The current limiter is turned on and its output is increased to 55 mA. The ring trip detector output NRDET should indicate a ring trip condition at approximately 100 mS after the circuit is put into this state. If NRDET indicates ring trip sooner than 70 mS, or does not indicate ring trip after 130 mS, the ring trip detector test fails, indicating that ringing should not be applied to the phone. This test should always follow the ringing generator, output at ground test and should be performed before ringing is applied to the phone.

10. RING TRIP RESET

This state, summarized at line 16 of Tables I and II, is the same as Talk State—High Battery, except that terminals RTFLT and VREG are shorted together to discharge the ring trip filter capacitor CRT. This test should always follow the Ring Trip Test and should be performed before applying ringing to the phone.

11. NOISE TEST

In this test, the receive interface RI as well as the AT and AR amplifiers are powered down, and the battery switch is turned on. Idle channel noise is measured by the microprocessor from the digital signal reported to it by the codec. The results of this test, along with the noise test results from the above transmission tests can be used to determine the source of the noise. If this test is passed while the transmission tests are noisy, then the receive interface circuit and/or the AT and/or AR amplifiers are noisy. If this test is noisy, the noise probably comes from the customer loop. While there is some possibility that the noise may be caused by the AX amplifier, experience indicates that failure of devices of this kind are in the range of a few parts per million.

Figure 3B:
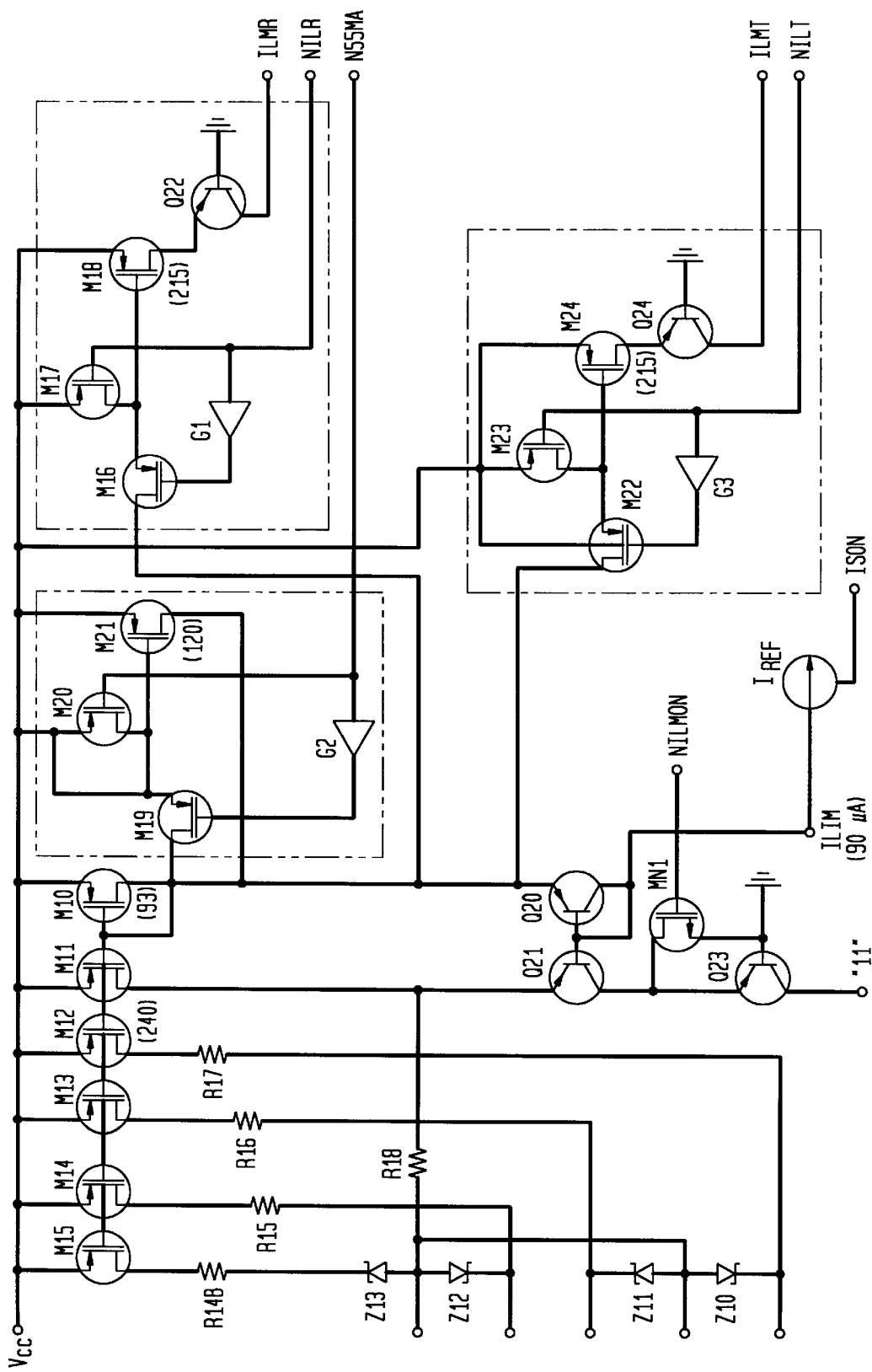

CURRENT LIMITER, FIGS. 3A and 3B:

The selection of whether battery VBAT1 or VBAT2 is connected to the loop is made by turning transistor DM1 on or off. The higher voltage source, VBAT1, is selected by transistor DM1 being turned on. The decode logic DL issues the ISON signal to the current limiter and battery switch, FIGS. 1 and 3, which turns on current source, $I_{Ref}$, putting a reference current into point "11". The reference current drives the base of transistor Q3A, turning it on and Q3A then turns on Q3B. The IBSON signal from the ringing generator circuitry provides 10 $\mu$A current to the gate of transistor DM1, turning it on. Transistor DM1 in the turned on state applies VABT1 to the anode of diode D2 whose cathode is connected to VBAT2. Diode D2 becomes reverse biased since VBAT1 is more negative than VBAT2. With diode D2 reverse-biased, the current limiter output terminal VREG is isolated from battery VBAT2 and transistor DM1 provides a current path from VBAT1 to terminal VREG. On the other hand, battery VBAT2 is connected to supply current to terminal VREG by turning off transistor DM1 and allowing diode D2 to become forward biased. To turn off transistor DM1, the ringing generator circuitry is controlled by the NBSON signal issued from decode logic DL to remove the bias current applied on lead IBSON and also to supply the IBSOFF signal to turn on transistors Q8 and Q9 and thereby lower the voltage at the gate of DM1, turning it off. Capacitor CBS, at the right hand side of FIG. 3A, is a fairly large capacitor, illustratively 0.1 $\mu$f, which provides a smooth transition in switching between VABT1 and VBAT2 by delaying the turnoff of transistor DM1. Capacitor CLIM, at the top center of FIG. 3A, which is also illustratively of 0.1 $\mu$f, is connected to the reference current source in series with resistor R9 and charges toward the potential of VBAT1 through the collector emitter path of transistor Q2 and the source drain path of transistor DM1. Capacitor CLIM, by functioning as a Miller capacitor, effectively provides 20 $\mu$f of capacitance from terminal VREG to ground at transistors Q3A and Q3B, thereby lowering the ac impedance to ground offered at terminal VREG.

The current limiting function is provided by transistors Q1 and Q2 functioning as a current mirror with respect to the reference bias current injected at point "11". The bases of the current mirror transistors Q1 and Q2 are driven by the Darlington-connected transistors Q3A and Q3B which function as transistor helpers to augment the reference current injected at point 11 into the base of transistor Q3A. The emitter size of transistor Q1 is scaled to have a small fraction, illustratively 1/72, of the current through Q2 while R2, in the emitter path of Q2, is a small fraction of R1 in the emitter path of Q1. With current mirror transistors Q1 and Q2 operating in series with transistor DM1, regulated current is supplied from source VBAT1 to terminal VREG. On the other hand, with transistors Q1 and Q2 operating and transistor DM1 cutoff, regulated current is supplied from source VBAT2 to terminal VREG. The limit to the current supplied out of terminal VREG is determined by the level of reference current supplied into point "11". The level of reference current so supplied is determined by decode logic DL issuing the ISON or N55MA signals. The N55MA signal, as shown in Table 1, is in the "0" state to provide a higher value of reference current into point "11" for on-hook transmission as well as for the transmission tests, fuse tests and a loop closure detector test and ring trip test. Resistor R4 between the emitter of the Darlington transistors and the bases of the current mirror transistors, together with capacitor C1, provide feedback to stabilize the current mirror-helper transistor arrangement by inserting a dominant pole in the feedback loop from the base of Q1, through R12 to the base of Q3A to provide an adequate phase and gain margin.

To turn off the current limiter, the reference current supply $I_{Ref}$ into point "11" is cut off by decode logic supplying the NILMON high signal (control path to $I_{Ref}$ not shown). With the removal of the reference current, the Darlington-connected current-regulating transistors Q3A and Q3B would turn off. However, capacitor CLIM, which has charged over the path previously mentioned, will continue to supply a reference current to the base of Darlington-connected transistors Q3A, Q3B for some time after the reference current into point 11 is cut off. If the ringing state (see Tables I and II, line 3) is to follow the on-hook transmission state, it is desirable to turn off the current limiter rapidly to discharge capacitor CLIM so that it does not shunt the ringing generator. To turn off the current limiter rapidly, decode logic DL makes the ILMR signal high, turning on the Darlington-connected transistors Q6A and Q6B to provide a discharge path for capacitor CLIM from VREG.

If, on the other hand, the disconnect forward state (see Tables I and II, line 5) is to ensue, it is desirable to turn off the current limiter softly so as not to send a noise impulse down the loop. To turn off the current limiter softly, ILMT is made high to turn on Q25 and Q26. These transistors then provide a path for the discharge of the capacitor in series with resistor R19 so that capacitor CLIM can continue to provide a temporary reference current into the current mirror.

CURRENT LIMITER REFERENCE SOURCE, FIG. 3B

FIG. 3B includes a current mirror circuit that, under the control of microprocessor/DSP issuing control signals to the decode logic DL, provides different reference currents to point "11" of the current limiter circuit of FIG. 3A. In addition, the circuitry at the right-hand side of FIG. 3B provides drive currents to terminals ILMR and ILMT at the righthand side of FIG. 3A to turn off the current limiter before ringing is applied to the loop and incident to disconnect forward, respectively.

Transistor M10 is the principal input transistor and transistor M11 is the principal output transistor of a current mirror circuit for providing controlled current to point "11" shown at the bottom of FIG. 3B and at the righthand side of FIG. 3A. In the illustrative embodiment, transistors M10 and M11 are field effect transistors. Their channel width-to-length ratios are relatively scaled, illustratively by the factors of (93) and (240), respectively, so that output transistor M11 will deliver to point "11" about 2.5 times the input reference current $I_{REF}$ to transistor M10. (It should be apparent, however that if bipolar transistors were to be used, the relative areas of their emitters rather than channel width-to-length ratio would be the relevant factor.) Transistor M10 is normally conducting in series with diode-connected transistor Q20 whose collector, as well as the base of transistor Q21, are drained by the 90 microampere reference source $I_{REF}$ so long as the decode logic DL provides control signal ISON=0. The bases of transistors Q20 and Q21 are connected together so that both have the same base to emitter voltage. Because of the channel width-to-length scaling factors of transistors M10 and M11, the output current delivered to point "11" by transistor M11 is larger than the reference current supplied into transistor M10. In addition, however, the output current delivered to point "11" may advantageously be supplemented by current from one or more of paralleled transistors M12 through M15, as will hereinafter be described. For convenience, however, the operation of the circuit will first be described ignoring transistors M12 through M15.

The drive current provided to point "11", shown at the bottom of FIG. 3B and also at the righthand side of FIG. 3A, by transistor M11 (through transistor Q21) is varied by switching transistor M21 into or out of parallel with transistor M10. This varies the channel width-to-length ratios of output transistor M11 relative to that of the either the combined input transistors M10 and M21 connected in parallel or to that of input transistor M10 alone.

During the normal high or low battery talk state when the loop current is to be limited to approximately 23 ma., decode logic DL maintains the N55MA=1 signal thereby keeping transistor M20 off and allowing inverter G2 to turn on transistor M19. Turning on transistor M19 turns on transistor M21 and effectively connects it in parallel with current mirror transistor M10 thereby lowering the channel width-to-length ratio between output transistor M11 and input transistors M11 and M21 in parallel. The channel width-to-length ratio of transistor M21 is 120 thereby providing an increased ratio above that provided by transistor M10 alone. When it is desired to increase the amount of current that the loop can draw, transistor M21 is switched out of parallel with transistor M10 thereby raising the ratio between output transistor M11 and input transistor M10. For the on-hook transmission state, current is limited to 55 ma. by the decoder logic DL issuing the N55MA=0 signal. This signal turns on transistor M20 which turns off transistor M21, removing transistor M21 from being in parallel with current mirror input transistor M10 and increasing the channel width-to-length ratio between the input and output transistors of the current mirror because the current ratio is determined by the relative size of output transistor M11 and input transistor M10 alone rather than by the relative size of output transistor M11 and input transistors M10 and M21 in parallel.

At the righthand side of FIG. 3B two other switching circuits are shown in dotted outline boxes. These switching circuits are similar to the above-described switching circuit that includes transistors M19 through M20 but, instead of varying the ratio between the emitter areas of input transistor M10 and output transistor M11, provide alternative output transistors M18 and M24. In the right-most dotted outline box, the gate of output transistor M18 can be connected to the gate of input transistor M10 by transistor M16 so that transistor M18 and transistor Q22 in series can function as the output transistors of a current mirror to terminal ILMR just as transistors M11 in series with transistor Q21 functioned as output transistors to point "11". The emitter area (215) of current mirror output transistor M18 is larger than the emitter area (93) of current mirror input transistor M10. During the normal talk state, decode logic DL issues control signals NILR=0 and NILT=0, thereby preventing transistors M18 and M24 from turning on because both transistors M17 and M23 are turned on. Transistor M23 shunts the gate and source of transistor M24 while transistor M17 shunts the gate and source of transistor M18, thereby preventing transistors M24 and M18 from turning on. With transistor M24 off, there is no current path for transistor Q24 to terminal ILMT and with transistor M18 off there is no current path for transistor Q22 to terminal ILMR. Accordingly, the circuit of FIG. 3B continues to supply a reference current to point "11" to current limiter circuit of FIG. 3A so that it functions normally to supply current regulated voltage to terminal VREG.

On the other hand, when decode logic DL issues the command NILR=1, which is issued to define the state preceding the application of ringing to the loop, transistor M17 is turned off but inverter G1 turns on transistor M16 which turns on current mirror output transistor M18, thereby completing a current path through transistor Q22 to terminal ILMR shown at the righthand side of both FIGS. 3B and 3A. The current to terminal ILMR turns on transistor Q6A of FIG. 3A which provides a rapid discharge path for capacitor CLIM, as described above. It should be noted that transistor M18 is advantageously made with an effective channel width-to-length ratio (215) several times larger than that (93) of transistor M10, illustratively two and a half times larger, so that transistor M18, when turned on, provides a larger current drive to terminal ILMR than is provided to current mirror input transistor M10.

Similarly, when decode logic DL issues the NILT=1 signal, which is the state preceding disconnect forward, transistor M23 is turned of and transistor M22 is turned on thereby turning on transistor M24 which completes a current path to terminal ILMT shown at the righthand side of FIGS. 3B and 3A. Likewise, transistor M24 is advantageously made with a channel width-to-length ratio several times larger than the emitter of transistor M10, illustratively two and a half times larger, so that transistor M24 when turned on provides a larger current drive to terminal ILMT than is provided to current mirror input transistor M10.

It was mentioned above that transistor M11 is part of the output current half of the current mirror circuit driving point "11". Actually, the width-to-length ratio of transistor M11 may be augmented by one or more of the P-channel transistors M12 through M15. Any of these transistors may be connected (prior to installing the line circuit unit), by converting one or more of the array of zener diodes Z13, Z12, Z11, Z10 (connected between the drain terminal of each of transistors M10–M15 and the emitter of transistor Q21), into a resistor. The breakdown voltage of the zener diodes (illustratively 14 volts for Vcc of 5 volts) is such that, under normal circuit conditions, none of them would be conducting. During manufacture, one or more of the zeners may be converted into a resistor in a process known as binary-weighted melt-back, or "Zener zap" adjustment. The number of zener diodes so converted is determined by the total output current required to be supplied to point "11".

PROTECTION CIRCUIT, PROT, FIG. 3A:

The lower left-hand portion of FIG. 3A shows the lightning protection circuit whose terminal PROT is connected to the DC feed resistor network at the junction of resistors RR2 and RR1. Should some external event apply an abnormally high negative potential to the loop, that potential applied to terminal PROT, is conducted through resistor R2 to cause zener diode array Z1P to break down, turning on transistor Q2P. When the current drawn through resistor R2 causes a voltage drop across the resistor that exceeds about 0.7 volts, SCR1 will be turned on, temporarily grounding the overly negative voltage. On the other hand, if an external voltage causes terminal PROT to rise above its normal potential, diode D1 will become forward biased and ground the over-voltage.

In addition to functioning as an over-voltage protector for the loop, the protection circuit also functions in a test mode to test the ring trip circuit that is connected to resistor RTFLT, FIG. 1. This test is performed in response to the decode logic DL issuing the NSCRON="0" signal which turns on transistor Q1P. Transistor Q1P turned on, in turn, turns on transistor Q3P. Transistor Q3P turned on, turns on transistor Q2P which triggers the SCRs. The conducting SCRs draw sufficient current from the ring generator to simulate an off-hook condition of the customer loop.

FUSE and FEED RESISTOR TEST CIRCUIT (FDET), FIGS. 4A and 4B:

The DC feed resistor and fuse detector circuit informs the microprocessor/DSP at terminal NLC as to the condition of the fuses and DC feed resistors of FIG. 1, whether VABT1 or VBAT2 is being fed to the loop. In addition, that part of the FDET circuit shown in FIG. 4B reports to terminal NLC whether high voltage is being applied to the ring lead during ringing. Terminal NLC will remain high during test to indicate the components are intact. The condition of the feed resistors and fuses is ascertained through resistors RFST and RFSR which have a fairly high value, illustratively, one megohm.

To test the DC feed resistors and fuses when VBAT2 is feeding the loop, decode logic DL issues the NFEN="0" and NHV="1" signals. The NFEN=0 signal turns on transistor B15a while the NHV=1 signal turns off transistor B17. Current drive is provided at terminal VPR3 to the bases of transistors B12 and B14. Transistor B15a, when turned on, provides an emitter current, illustratively 20 $\mu$A, through resistor R1E to transistor B12 and an emitter current, illustratively 10 $\mu$A, through resistor R7B to transistor B14.

To test the DC feed resistors and fuses when VBAT1 is feeding the loop, decode logic DL issues the NHV="0" signal, turning on transistor B17 making available to transistor B14 through resistor R7A, an additional emitter current, illustratively 20 $\mu$A, thereby supplying transistor B14 with a total of 30 $\mu$A. The different current supplies made available to transistors B23 and B24 make these transistors sensitive to different threshold conditions at terminals RFSR and RFST to permit testing of the DC feed resistors and fuses of FIG. 1 whether VABT1 or VBAT2 is supplying current to terminal VREG and, in fact, to verify whether the expected battery supply is in fact connected.

When so enabled by the NFEN and/or NHV signals from decode logic DL, transistors B12 and B14 make available different value reference currents to the collectors of transistors B23 and B24 whose emitter circuits are connected, respectively, to terminals VABT1 and RFSR. When VABT1 feeds the ring lead and when the fuse RF and DC feed resistors of FIG. 1 are intact, transistor B24 should draw approximately 40 microamperes causing its collector, and the base of the left OR gate transistor B5, to go low. The OR gate transistors B5 supply drive to the base of transistor B1Y whose collector is connected to terminal NLC. When the left OR gate transistor B5 is off, terminal NLC remains high. If, for any reason, one of the aforementioned FIG. 1 DC feed resistors or fuse FR is open-circuited, transistor B24 will not conduct any of the current made available by transistor B14. The collector of transistor B24 will therefore be at a logic high, turning on the left OR gate transistors B5 which, in turn, turns on transistor B1Y causing its collector, which is connected to terminal NLC, to go low. Referring to FIG. 1, it is seen that the low signal at terminal NLC is reported to the microprocessor/DSP as a trouble condition occurring during the feed resistor and fuse test.

With respect to terminal RFST, the normal ground potential which should be reflected there from the tip lead of FIG. 1 will cause current mirror transistor B33 to turn on, turning on transistor B34 and causing transistor B23 to draw the current made available through transistor B23. Current through transistor B23 causes its collector to go low, turning off transistor B22 and removing the base drive for the right-hand one of OR gate transistors B5. If neither of the B5 transistors is turned on, transistor B1Y will not be turned on, and terminal NLC will remain high informing the microprocessor/DSP that the fuses and DC feed resistors of FIG. 1 are operating correctly. Accordingly, it is seen that for a logic high to be reported to terminal NLC, transistor B1Y should not be turned on and this will be the case so long as both transistors B23 and B24 are conducting and their current exceeds the current through transistors B12 and B14. It will be appreciated that when the decode logic issues the NHV="0" signal the threshold of the feed resistor and fuse detector circuit is set to indicate the condition of the feed resistors and fuses where VABT1 is feeding the ring lead. If, however, VABT1 is not so connected, the current through transistor B24 will not exceed the current through transistor B14 and the high signal at the collector of transistor B24 will turn on the OR gate B5 and terminal NLC will report a low to the microprocessor/DSP. Accordingly, the feed resistor and fuse detector circuit functions to test that the expected battery VBAT1 is in fact connected when expected. Transistors B10 and B27 provide clamping to prevent saturation of the collectors of transistors B12, B14, B23 or B24 under the different working potentials that may be reflected at terminals RFSR and RFST in practice.

LOOP CLOSURE TEST CIRCUIT (LCT), FIG. 4A:

Two tests of the loop detector are performed, first with terminal NLC forced on-hook and then with terminal NLC forced off-hook. For both tests the current supply to the AX amplifier (IPR2=1) is removed, thereby placing the output of the AX amplifier, which is connected to terminal INM of comparator CMP1, in the high impedance state.

For the forced on-hook test, a voltage ⅕ of VBAT1 is applied to terminal INM by the LCT circuitry shown in the lower right-hand portion of FIG. 4. This potential is obtained from the tap of resistor divider Rx, Ry which is connected between VBAT1 and ground. The tap of divider Rx, Ry is connected to the base of transistor B3F. At this time, as shown in line 12 of Tables I and II, decode logic DL issues the NLCTO=0, NLCTC=1 signals, the former turning on transistor B1B and the latter turning transistor B5Y off. Transistor B1B provides a current for transistors B3E, diode Y2 and current mirror transistors B35F and B2Y2. (In this path, base bias current for transistor 133E is provided by the same base rail VPR3 as supplied the base of transistor B12 of the FDET circuit, described above.) The current into transistor B35F is reflected as a current in current mirror transistor B2Y2. The current through transistor B2Y2 pulls down a current through diode Y3 and emitter-follower B1Y. The emitter follower clamps the potential at terminal INM to approximate the same voltage that is presented at the tap of divider Rx, Ry which may be appreciated by observing that the path from the tap to terminal INM passes through four conducting diode drops, two involving potential rises and two involving potential drops. Since the potential at the tap of divider Rx, Ry is approximately 12 v DC, that is the potential to which terminal INM is clamped. It will be recalled from the description of the loop closure detector that the other terminal of comparator CMP1, terminal INP, FIG. 2A, is connected to the tap of resistor divider FLC1, RLC2 to vary the loop closure detector threshold in accordance with the actual voltage present at terminal VREG. It will be recalled that amplifier AX, in normal operation, applies to terminal INM the actual on-hook and off-hook potentials existing between the loop conductors and this potential may vary significantly. Accordingly, when amplifier AX is in normal operation and circuit LCT is not activated to check the operation of the loop detector, circuit LCT must present a high impedance to terminal INM.

For the forced off-hook test of the loop detector, described at line 13 of Tables I and II, conditions are the same except that the logic detector DL issues signals to circuit LCT so that terminal INM of comparator CMP1 is forced to ground. The NLCTC=0, ISON=1 and N55MA=0 signals from decode logic DL turn off the normal reference current drive to the current limiter and, instead, provide a reference current drive that will limit the loop current to 55 mA. The NLCTC=0 signal turns on transistor B5Y at the upper right-hand corner of the LCT circuit. Turning on transistor B5Y applies Vcc to the emitter of transistor B4F causing it to conduct heavily. This produces sufficient voltage across the base biasing resistor for transistor B1Y to draw the base of transistor B1Y upward to ground. This forces terminal INM to ground.

HIGH VOLTAGE DETECTION, FIG. 4B:

During ringing, the high negative battery applied at terminal VRS (FIG. 1) is applied to the ring lead through the ringing generator. The fuse and DC feed resistor detector circuit FDET is enabled by decode logic DL signals NRHVL through NRGHV3 low, while signal LCOFF high (FIG. 4A), turns off transistor B5 in loop closure comparator CMPL1 thereby preventing the loop closure state from affecting terminal NLC. Resistor R4, FIG. 4A, thus keeps terminal NLC high unless it is dragged down by transistor B1Y2, FIG. 4B. When the circuit is not in the ringing test states (terminals NRGHV1 through NRGHV3 all high), transistors BX2L, resistor R2E and transistor B4Y1 disable transistor B1Y2 so that it does not falsely drag down terminal NLC. Separate drives are provided by decode logic DL to transistors BX1L to accommodate both the ringing generator at ground test and the ringing generator high voltage test. During the ringing generator at ground test, terminal NRGND is placed in the logic low state by decode logic DL while during the ringing generator high voltage test, terminals NRGND and NRGHV1 are both low. Terminal VREG, FIGS. 1 and 4B, is connected to the emitter of transistor B2EX, FIG. 4B, through series-connected resistors RLC1 and RLC2. The emitter of transistor B2EX and terminal IREG are kept at ground by transistors B32F, B31F, B19F and the drive at terminal VCL. Transistor B19F supplies current to bias transistors B31F and B32F which set up a reference voltage for transistor B2EX. With transistor B32F conducting, its emitter is at ground thereby placing the base of transistor B2EX at ground. The collector current of transistor B2EX is provided by the enabled transistors B18F, the series combination of transistors B30F and BX1LB and the series combination of transistors B29F and B5Y.

In the illustrative embodiment the combined resistance of resistors RLC1 and RLC2 is 0.6 megohms so that when terminal VREG is at −130 V and the emitter of transistor B2EX is at ground the current through transistor B2EX will be approximately 215 μA. When the potential at terminal VREG is closer to ground than −130 V, there will be less than 215 μA through transistor B2EX and the potential at its collector (point "52") will be high enough to keep the Darlington connected transistors B3Y2 and B4Y2 on. When the Darlington transistors are on they turn transistor B1Y2 on. Transistor B1Y2 in the on state keeps terminal NLC dragged down to a logic low level. When the potential at terminal VREG goes through the −130 V threshold in the negative direction, the Darlington transistors and transistor B1Y2 are turned off, allowing terminal NLC to reflect a high to the microprocessor/DSP.

It will be recalled that, in the non-ringing generator test states, the loop closure comparator CMP1 functions as a loop resistance detector since the threshold for loop closure detection is varied in accordance with the voltage at VREG. When the absolute value of VREG drops too low for accurate loop state detection, there will not be enough current for the loop to operate and terminal NLC should report the on-hook condition to the microprocessor/DSP. Accordingly, when VREG is too small to draw enough current to keep the Darlington transistors B3Y2, FIG. 4B, off, transistor B18F, supplies a current to terminal IREG to turn on transistor B2Y3. The collector of transistor B2Y3 is connected to terminal NLCOFF which is connected to diode-connected transistor B3 of comparator CMP1, FIG. 4A. Transistors B3 and B4 of the comparator form a current mirror. When transistor B2Y3 draws current from terminal NLCOFF through transistor B3, a similar current will be drawn through transistor B4, or transistor B4 will go into saturation. When transistor B4 saturates, transistor B5 cannot be turned on so resistor R4 forces terminal NLC high.

What has been described is a line interface circuit which is configured to permit an assortment of tests to be performed in a self-contained manner at a location remote from the central office without the use of an electromechanical relay to isolate the line interface circuit from the loop. It will be readily apparent to those having ordinarily skill in the art that numerous modifications may be made thereto without departing from the spirit and scope of the subject invention as defined by the appended claims.

TABLE I

| Condition/Test | NBSON | RCT | RCLKI | NILMON | ILMR | ILMT | N55MA | ISON | PRSW | HBSW | NSCR | NRTR |
|---|---|---|---|---|---|---|---|---|---|---|---|---|
| 1 Talk State - High Bat. (Normal PU) | 0 | 0 | 1 | 0 | 0 | 0 | 1 | 0 | 1 | 1 | 1 | 1 |
| 2 Talk State - Low Bat. (Normal PU) | 1 | 0 | 1 | 0 | 0 | 0 | 1 | 0 | 1 | 1 | 1 | 1 |
| 3 Ringing (PD; NLC indic. RG @ HV) | 0 | 1 | CLK | X | 1 | X | 1 | 0 | 0 | X | 1 | 1 |
| 4 Sleep; High Bat./Noise Test (PD: RI, AT, AR, AX, Scan Loop Clos.) | 0 | 0 | 1 | 0 | 0 | 0 | 1 | 0 | 1 | 0 | 1 | 1 |
| 5 Fwd Disconn'ct (PD: RI, AT, AR, AX; XMT @ Gnd. | 0 | 0 | 1 | 1 | 0 | 1 | 1 | 0 | 1 | 1 | 1 | 1 |
| 6 On-hook Transmission (Normal PU) | 0 | 0 | 1 | 0 | 0 | 0 | 0 | 1 | 1 | 1 | 1 | 1 |
| 7 Loopback Test (PD: RI, AT, AR, AX; XMT @ Gnd. | 0 | 0 | 1 | 1 | 0 | 1 | 1 | 0 | 1 | 0 | 1 | 1 |
| 8 Ring Side Trans. Test (PU; PD: AT) | 0 | 0 | 1 | 0 | 0 | 0 | 0 | 1 | 1 | 0 | 1 | 1 |
| 9 Tip Side Trans. Test (PU; PD: AR) | 0 | 0 | 1 | 0 | 0 | 0 | 0 | 1 | 1 | 0 | 1 | 1 |
| 10 Fuse Test - High Bat., Threshold High (PD; NLC indic. Fuse Det.). | 0 | 0 | 1 | 0 | 0 | 0 | 0 | 1 | 1 | 0 | 1 | 1 |

TABLE I-continued

| Condition/Test | NBSON | RCT | RCLKI | NILMON | ILMR | ILMT | N55MA | ISON | PRSW | HBSW | NSCR | NRTR |
|---|---|---|---|---|---|---|---|---|---|---|---|---|
| 11 Fuse Test - Low Bat., Threshold Low (PD; NLC indic. Fuse Det.). | 1 | 0 | 1 | 0 | 0 | 0 | 0 | 1 | 1 | X | 1 | 1 |
| 12 Loop Closure Test - NLC forced On-hook (PD: RI, AT, AR, AX; XMT @ VBAT1/5). | 0 | 0 | 1 | 0 | 0 | 0 | 1 | 0 | 1 | 1 | 1 | 1 |
| 13 Loop Closure Test - NLC forced Off-hook (PD: RI, AR, AR, AX; XMT @ Gnd.) | 0 | 0 | 1 | 0 | 0 | 0 | 0 | 1 | 1 | 1 | 1 | 1 |
| 14 Ringing Gen. Test (PD: NLC indic RG output @ Gnd.) | 0 | 1 | 1 | 0 | 0 | 0 | 1 | 0 | 0 | X | 1 | 1 |
| 15 Ring Trip Test (PD: NLC indic. RG output @ Gnd.) | 0 | 0 | 1 | 0 | 0 | 0 | 0 | 0 | 1 | X | 0 | 1 |
| 16 Ring Trip Reset (PU; PD: AT) | 0 | 0 | 1 | 0 | 0 | 0 | 1 | 0 | 1 | 1 | 1 | 0 |
| 17 Fuse Test - Low Bat., Threhold Hi. (PD; NLC indic. Fuse Det.). | 1 | 0 | 1 | 0 | 0 | 0 | 0 | 1 | 1 | X | 1 | 1 |

TABLE II

| CONDITION/TEST | TPD | RPD | IPR1 | IPR2 | NLCTO | NLCTC | NFEN | NHV | NRG | NRGH | LCOF |
|---|---|---|---|---|---|---|---|---|---|---|---|
| 1 Talk State - High Bat. (Normal PU). | 0 | 0 | 0 | 0 | 1 | 1 | 1 | 1 | 1 | 1 | 0 |
| 2 Talk State - Low Bat. | 0 | 0 | 0 | 0 | 1 | 1 | 1 | 1 | 1 | 1 | 0 |
| 3 Ringing (PD:; NLC indic. RG @ HV) | 1 | 1 | 1 | 1 | 0 | 1 | 1 | 1 | X | 0 | 1 |
| 4 Sleep; High Bat./Noise Test (PD: RI, AT, AR, AX, Scan Loop Closure). | 1 | 1 | 1 | 0 | 1 | 1 | 1 | 1 | 1 | 1 | 0 |
| 5 Fwd Disconn'ct (PD: RI, AT, AR, AX; XMT @ Gnd.) | 1 | 1 | 1 | 1 | 0 | 0 | 1 | 1 | 1 | 1 | 0 |
| 6 On-hook Transmission (Normal PU) | 0 | 0 | 0 | 0 | 1 | 1 | 1 | 1 | 1 | 1 | 0 |
| 7 Loopback Test (PD: RI, AT, AR, AX; XMT @ Gnd) | 1 | 1 | 1 | 1 | 0 | 0 | 1 | 1 | 1 | 1 | 0 |
| 8 Ring Side Trans. Test ((PU; PD: AT). | 1 | 0 | 0 | 0 | 1 | 1 | X | X | X | X | X |
| 9 Tip Trans. Test (PU; PD: AR). | 0 | 1 | 0 | 0 | 1 | 1 | X | X | X | X | X |
| 10 Fuse Test - High Bat., Threshold Hi (PD; NLC indic. Fuse Detector). | 1 | 1 | 1 | 1 | 0 | 1 | 0 | 0 | 1 | 1 | 1 |
| 11 Fuse Test - Low Bat., Threshold Low (PD; NLC indic. Fuse Detector). | 1 | 1 | 1 | 0 | 1 | 1 | 0 | 1 | 1 | 1 | 1 |
| 12 Loop Closure Test - NLC forced On-hook (PD: RI, AT, AR, AX; XMT @ 1/5 VBAT1). | 1 | 1 | 1 | 1 | 0 | 1 | 1 | 1 | 1 | 1 | 0 |
| 13 Loop Closure Test - NLC forced Off-hook (PD: RI, AR, AR, AX; XMT @ Gnd.) | 1 | 1 | 1 | 1 | 0 | 0 | 1 | 1 | 1 | 1 | 0 |
| 14 Ringing Gen. Test, Output at Ground (PD; NLC indic RG output @ Gnd.) | 1 | 1 | 1 | 1 | 0 | 1 | 1 | 1 | 0 | 1 | 1 |
| 15 Ring Trip Test (PD; NLC indic. RG @ Gnd). | 1 | 1 | 1 | 1 | 0 | 1 | 1 | 1 | 0 | 1 | 1 |
| 16 Ring Trip Reset (PU; PD: AT). | 1 | 0 | 0 | 0 | 1 | 1 | X | X | X | X | X |
| 17 Fuse Test - Low Bat., Threshold Hi. (PD; NLC indicates Fuse Detector). | 1 | 1 | 1 | 0 | 1 | 1 | 0 | 0 | 1 | 1 | 1 |

What is claimed is:

1. A line interface circuit having self-contained, self-testing circuit elements for providing battery feed, over-voltage protection, ring insertion, supervision, coding/decoding and hybrid (BORSCHT) functions for a subscriber's loop, said line interface circuit comprising:
   a. a feed resistor network connectable to said loop;
   b. a dual voltage regulated current source connected to said network;
   c. line driving and receive amplifier means connected to said feed resistor network, and
   d. a microprocessor/DSP for controlling the application of power to said current source and to said line driving and receive amplifier means while said line interface circuit is connected to said loop to enable said circuit elements to provide said BORSCHT functions and for selectively denying power to said line driving and receive amplifier means to place said means in a high impedance state so as to isolate or include said amplifier means in circuit for testing purposes while said circuit is connected to said loop.

2. A line interface circuit according to claim 1 having an analog signal dc-level shifting circuit interposed between the analog input and output of said codec, said microprocessor isolating or including said level shifting circuit for said testing purposes.

3. A line interface circuit according to claim 1, wherein said line driving means includes a codec, said microprocessor/DSP exchanging digital signals with said codec for testing purposes.

4. A line interface circuit according to claim 3, including comparator means having one of its inputs connected to the output of said line receiving amplifier and another of its inputs connected to said dual voltage current source for accurately reporting said loop status to said microprocessor/DSP independently of which voltage is applied to said network by said dual voltage source.

5. A line interface according to claim 4, wherein said microprocessor/DSP during testing connects a fraction of the voltage being applied by said dual voltage source to said resistor network to said one input of said comparator means.

6. A line interface according to claim 5, wherein said microprocessor/DSP during testing places said receive amplifier means in the high impedance state.

7. A line interface according to claim 6, wherein said microprocessor/DSP during testing places forces the output of said receive amplifier to ground, said comparator comparing the output of said receive amplifier with said voltage.

8. A line interface circuit according to claim 1, wherein the output of said line driving amplifier means is ac coupled to said loop and further including means intermediate the analog output of said codec and the input to said line driving amplifier means for establishing the dc level of the analog signal applied to said loop.

9. A line interface circuit according to claim 8, wherein said means for establishing the dc level of the analog signal applied to said loop is controllable by said microprocessor/DSP to couple the output of said codec to the input of said line driving amplifier means to provide said BORSCHT functions or to exhibit a high impedance state to isolate said codec output from the input of said line driving amplifiers.

10. A line interface circuit according to claim 8, wherein said means for establishing the dc level of the analog signal applied to said loop includes:
 a pair of reference current sources controllable by said microprocessor/DSP,
 transistor means intermediate said reference current sources, said transistor and
 means being operable for connecting the analog output of said codec to the input of said line driving amplifier means.

11. A line interface circuit according to claim 10, wherein said line driving amplifier means includes an amplifier respective to each conductor of said loop and wherein said means including said transistor intermediate said reference current sources includes a transistor respective to an input of each said respective amplifier.

12. A line interface circuit according to claim 11, wherein said respective transistor drives a non-inverting input of said respective amplifier.

13. A line interface circuit according to claim 8, wherein said line driving and receive amplifiers are all powered up by said microprocessor/DSP to provide said normal BORSCHT functions and wherein said microprocessor/DSP selectively powers up said amplifiers during testing, said amplifiers and said interface means being placed in a high impedance state when not powered up.

14. A line interface circuit according to claim 3, said microprocessor/DSP during testing:
 a. applying a digital tone signal to the codec's digital input and analyzing the digital signal appearing at the codec's digital output and,
 b. selectively placing said drive amplifier means and said receive amplifier means in high impedance states.

15. A line interface circuit according to claim 14, wherein said line driving amplifier means is ac coupled to said loop and including a controllable interface intermediate said codec and said line driving amplifier means to establish the dc level of the analog signal applied by said codec to said loop and wherein said codec, responsive to said digital signal, applies an analog signal to said controllable interface means.

16. A line interface circuit according to claim 15, wherein said line driving amplifier means includes an amplifier respective to each conductor of said loop and wherein said microprocessor/DSP controls said interface means and one said respective line driving amplifier to be in the BORSCHT function mode and controls the other of said respective line driving amplifier to be in the high impedance state.

17. A line interface circuit according to claim 14, further including switch means controllable by said microprocessor/DSP during testing for selectively connecting the analog output of said codec to the analog input thereof, said microprocessor/DSP placing both said receive amplifier and said drive amplifier means in said high impedance state.

18. A method of testing a loop interface circuit having a plurality of circuit elements for providing (battery feed, over-voltage protection, ring insertion, supervision, coding/decoding and hybrid BORSCHT) functions to said loop, including a codec for transmitting analog signals over said loop in response to digital signals from a processor and for sending digital signals to said processor in response to analog signals received over said loop, and loop driving and receive amplifiers intermediate said loop and said codec, said method comprising:
 a. selectively placing said loop driving and receive amplifiers in a high impedance state to isolate the codec's input and output from said loop;
 b. connecting the analog output of said codec to its analog input; and
 c. causing said processor to apply a digital tone code to, and to analyze the corresponding digital signal returned from, said codec.

19. A method of testing a loop interface circuit having a plurality of circuit elements for providing (battery feed, over-voltage protection, ring insertion, supervision, coding/decoding and hybrid BORSCHT) functions to said loop, including a codec for transmitting to and receiving from said loop analog signals and for receiving from and transmitting to a processor corresponding digital signals, a driving amplifier respective to each lead of said loop for applying differential analog signals to said loop, and a receive amplifier connected between said leads of said loop, said method comprising:
 a. selectively placing said loop driving amplifier respective to one of said leads in a high impedance state to isolate the codec's analog output from said one lead of said loop;
 b. maintaining the other said driving amplifier and said receive amplifier enabled to transmit analog signals to and receive analog signals from the other of said leads; and
 c. causing said processor to apply a digital tone code to, and to analyze the corresponding digital signal returned from, said codec.

20. A method of testing said loop interface circuit according to claim 19 wherein said loop interface circuit includes a resistor network for providing DC current to said loop and wherein said processor verifies the condition of said resistor network by sensing the reflection of said analog signals at said resistor network.

21. A method of testing said loop interface circuit according to claim 20 wherein said resistor network presents a finite terminating impedance to said analog signals applied to said loop and wherein said processor ascertains said reflection of said analog signals by said network from said digital signals received by said processor from said codec.

22. A method of testing said loop interface circuit according to claim 21 wherein said processor compares the levels of said applied and reflected analog signals by sensing said digital signals received from said codec.

23. A method of testing said loop interface circuit according to claim 22 wherein said analog output of said receive amplifier is compared with a predetermined DC value.

24. A method of testing said loop interface circuit according to claim 23 wherein said predetermined DC value is a fraction of the battery voltage supplied by said BORSCHT function.

25. A method of testing the DC feed resistor network of a loop interface circuit having a plurality of processor controlled circuits for providing (battery feed, over-voltage protection, ring insertion, supervision, coding/decoding and hybrid BORSCHT) functions to said loop including current-limited high or low battery voltage, an amplifier for normally receiving analog signals from said loop and for producing an output determined by the potential between the conductors of said loop, a comparator for monitoring said amplifier output against a threshold set by said battery voltage and for applying a logic level signal to said processor indicative of loop status, said processor verifying the condition of said resistor network, comprising the steps of:
    a. placing said receiving amplifier in a high impedance state to isolate the input and output of said amplifier from said loop;
    b. applying ground potential to the tip lead and selectively applying said high and said low battery potentials to the ring lead of said loop;
    c. setting a respective threshold for detecting tip lead and ring lead current through said network in accordance with said selectively applied battery voltage; and
    d. applying a logic level signal to said processor when each said respective threshold is crossed.

26. A method of testing the loop closure detector of a loop interface circuit having a plurality of processor controlled circuits for providing (battery feed, over-voltage protection, ring insertion, supervision, coding/decoding and hybrid BORSCHT) functions to said loop including current-limited high or low battery voltage, an amplifier for normally receiving analog signals from said loop and for producing an output determined by the potential between the conductors of said loop, a comparator for monitoring said amplifier output against a threshold determined by said battery voltage and for applying a logic level signal to said processor indicative of loop status, said processor verifying the condition of said loop closure detector, comprising the steps of:
    a. placing said receive amplifier in the high impedance state to isolate its input from said loop and its output from one input of said comparator;
    b. selectively forcing said one input of said comparator to ground or to a fraction of said battery voltage; and
    c. applying a fraction of normal battery voltage to the other input of said comparator.

27. A method of testing the ringing generator of a loop interface circuit having a plurality of processor controlled circuits for providing (battery feed, over-voltage protection, ring insertion, supervision, coding/decoding and hybrid BORSCHT) functions to said loop including current-limited high or low battery voltage, an amplifier for normally receiving analog signals from said loop and for producing an output determined by the potential between the conductors of said loop, a comparator for monitoring said amplifier output against a threshold set by said battery voltage and for applying a logic level signal to said processor indicative of loop status, said processor verifying the condition of said ringing generator, comprising, prior to applying ringing voltage to said loop, the steps of:
    a. placing said receiving amplifier in a high impedance state to isolate the input and output of said amplifier from said loop;
    b. causing said ringing generator to ramp its output from said battery voltage towards ground potential;
    c. monitoring the potential at the ring conductor; and
    d. reporting a logic level signal to said processor when said monitoring of said potential crosses a predetermined threshold.

28. A method of testing the ringing generator of a loop interface circuit according to claim 9 comprising:
    a. during ringing, disconnecting said battery and applying high negative battery to said ring lead through said ringing generator; and
    b. reporting a logic level high signal to terminal NLC when the voltage on the ring lead crosses a predetermined negative threshold.

29. A method of testing the tripping of the ringing generator of a loop interface circuit having a plurality of processor controlled circuits for providing said (battery feed, over-voltage protection, ring insertion, supervision, coding/decoding and hybrid BORSCHT) functions to said loop according to claim 10 and including an SCR for grounding said ring lead during an over-voltage condition thereon, said processor verifying the condition of said tripping of said ringing generator, comprising, prior to applying ringing voltage to said loop and subsequent to testing for the appearance of said high negative battery voltage, the steps of:
    a. maintaining said receiving amplifier in a high impedance state to isolate the input and output of said amplifier from said loop;
    b. turning off said ringing generator;
    c. temporarily turning on said over-voltage SCR while limiting said loop current;
    d. enabling said ring trip detector to report the tripping of ringing to said processor;
    e. determining the time interval between the enabling of said ring trip detector and the reporting of said tripping; and
    f. inhibiting the application of ringing if ring tripping is reported outside a predetermined interval.

30. A method of self-testing of a loop interface circuit having a plurality of circuit elements including an on-board processor for providing BORSCHT functions to said loop, including a codec for transmitting analog signals over said loop in response to digital signals from said processor and for sending digital signals to said processor in response to analog signals received over said loop, and loop driving and receive amplifiers intermediate said loop and said codec, said method comprising:
    a. activating said circuit elements from said on-board processor for placing said loop driving and receive amplifiers in a high impedance state to isolate the codec's analog input and output from said loop; and
    b. monitoring from said on-board processor the idle channel noise that appears at the digital output of said codec.

31. A line circuit having line driving and receive amplifiers, a codec, and an interface between said codec and said amplifiers to establish the dc level of the analog signals at the codec output, said line circuit providing BORSCHT functions including battery feed, over-voltage protection, ring insertion, supervision, coding/decoding and hybrid under the control of a microprocessor/DSP, the improvement wherein said microprocessor/DSP controls the execution of a plurality of the following steps:
    (a) a loop back test in which the tip and ring driving and receive amplifiers and their interface to the codec are turned off to place them in a high impedance state so as to isolate the codec's input and output from the tip and ring conductors of the loop, said microprocessor/DSP applying a digital tone code to the codec's digital input, the codec's analog output being connected to its analog input and the codec's digital output being connected to the microprocessor/DSP for analysis;

(b) a tip side transmission test in which the tip side driving amplifier and the receiving amplifier are enabled but the ring side driving amplifier is turned off and placed in a high impedance state; the microprocessor/DSP issuing a digital tone code to the codec's digital input, the codec's analog output supplying a test tone to the tip driving amplifier and in which the reflection of the test tone from the resistor network is sensed by the receive amplifier and applied to the codec's analog input and the codec's digital output is analyzed by the microprocessor/DSP to determine if the enabled amplifiers, loop terminating resistors and coupling capacitors are functional; and (c) a ring side transmission test which performs counterpart functions for the ring side transmission path.

32. A line interface circuit according to claim 31, said circuit having DC feed resistors, fuses and a current limiter, wherein said microprocessor/DSP controls the execution of a plurality of the following tests:

(a) a test which uses part of the loop closure detector circuitry to report to said microprocessor/DSP the state of the DC feed resistors and fuses with high battery applied;

(b) a test of the DC feed resistors and fuses with low battery applied through the current limiter biased for linear operation with no loop current (as for on-hook transmission);

(c) a test of the loop closure detector forced on-hook, the receive amplifier being turned off and the input of the loop closure detector being connected to a voltage that is a fraction of normal battery; and (d) a test of the loop closure detector forced off-hook, the receive amplifier being turned off and the input to the loop closure detector being connected to ground.

33. A line interface circuit according to claim 31 having a ring trip filter capacitor and an over-voltage protection circuit including an SCR and wherein said microprocessor/DSP controls the execution of a plurality of the following tests:

(a) a test of the ringing generator, performed prior to applying ringing to the phone, in which a 20 Hz ringing clock is internally forced to a low positive voltage, the ringing generator is turned on and its output ramped from normal working battery voltage (VBAT1) to ground;

(b) a ring trip test, which follows the test of the ringing generator, in which the ringing generator is turned off, said SCR in the over-voltage protection circuit is turned on and the loop current is limited by the current limiter; and (c) a ring trip reset state in which the ring trip filter capacitor is discharged prior to applying ringing to the loop.

34. A line interface circuit according to claim 31 wherein said line circuit includes a battery switch for selecting either of two working battery voltages, and in which said microprocessor/DSP conducts a noise test in which all amplifiers and the receive interface are powered down but the battery switch is turned on and the idle channel noise from the loop that appears at the analog input of the codec is measured codec.

* * * * *